US012784244B2

(12) United States Patent
Miyata

(10) Patent No.: US 12,784,244 B2
(45) Date of Patent: Nov. 3, 2026

(54) THREE-DIMENSIONAL GEOMETRY MEASUREMENT APPARATUS, THREE-DIMENSIONAL GEOMETRY MEASUREMENT METHOD, AND STORAGE MEDIUM

(71) Applicant: MITUTOYO CORPORATION, Kanagawa (JP)

(72) Inventor: Kaoru Miyata, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 218 days.

(21) Appl. No.: 18/782,508

(22) Filed: Jul. 24, 2024

(65) Prior Publication Data

US 2025/0045943 A1 Feb. 6, 2025

(30) Foreign Application Priority Data

Aug. 1, 2023 (JP) ................................ 2023-125676

(51) Int. Cl.
*G06T 7/521* (2017.01)
*G01B 11/25* (2006.01)
(Continued)

(52) U.S. Cl.
CPC .......... *G06T 7/521* (2017.01); *G01B 11/2513* (2013.01); *G06T 7/11* (2017.01);
(Continued)

(58) Field of Classification Search
CPC ... G06T 7/521; G06T 7/11; G06T 7/60; G06T 7/73; G06T 2200/04; G06T 2207/10021;
(Continued)

(56) References Cited

U.S. PATENT DOCUMENTS 4,634,278 A * 1/1987 Ross .................. G01B 11/2536 356/610
6,421,629 B1 * 7/2002 Ishiyama ............. G01B 11/255 702/159
(Continued)

FOREIGN PATENT DOCUMENTS

JP 2017-146298 8/2017

OTHER PUBLICATIONS

Tianyang Tao, Qian Chen, Shijie Feng, Jiaming Qian, Yan Hu, Lei Huang, and Chao Zuo, "High-speed real-time 3D shape measurement based on adaptive depth constraint," Opt. Express 26, 22440-22456 (2018) (Year: 2018).*

*Primary Examiner* — Christopher E Leiby
(74) *Attorney, Agent, or Firm* — Greenblum & Bernstein, P.L.C.

(57) ABSTRACT

Three-dimensional geometry measurement apparatuses includes: a first identification part that identifies a primary absolute phase value corresponding to each of a plurality of pixels of a first image capturing part; a second identification part that identifies a secondary absolute phase value corresponding to each of a plurality of pixels of a second image capturing part; a conversion identification part that identifies a conversion value for converting primary coordinates or secondary coordinates; and a geometry identification part that converts the primary coordinates or the secondary coordinates on the basis of the conversion value, and identifies a three-dimensional geometry of an object to be measured on the basis of the converted coordinates.

9 Claims, 19 Drawing Sheets

(51) Int. Cl.
*G06T 7/11* (2017.01)
*G06T 7/60* (2017.01)
*G06T 7/73* (2017.01)

(52) U.S. Cl.
CPC .................. *G06T 7/60* (2013.01); *G06T 7/73* (2017.01); *G06T 2200/04* (2013.01); *G06T 2207/10021* (2013.01); *G06T 2207/10028* (2013.01); *G06T 2207/10152* (2013.01); *G06T 2207/20021* (2013.01)

(58) Field of Classification Search
CPC . G06T 2207/10028; G06T 2207/10152; G06T 2207/20021; G01B 11/2513; G01B 11/2527; G01B 11/254
See application file for complete search history.

(56) References Cited

U.S. PATENT DOCUMENTS

| | | | | |
|---|---|---|---|---|
| 9,418,115 | B2 * | 8/2016 | Ganick | H04B 10/1149 |
| 10,473,916 | B2 * | 11/2019 | Wang | G06T 1/0007 |
| 10,627,216 | B2 * | 4/2020 | Matsuda | G01N 21/8806 |
| 2003/0174880 | A1 * | 9/2003 | Sakamoto | G06V 10/145 382/154 |
| 2007/0115484 | A1 * | 5/2007 | Huang | G01B 11/2527 356/604 |
| 2007/0276598 | A1 * | 11/2007 | Tillotson | G01W 1/10 342/357.52 |
| 2009/0097039 | A1 * | 4/2009 | Kawasaki | G01B 11/2509 356/603 |
| 2013/0141544 | A1 * | 6/2013 | Tsuyuki | H04N 13/254 348/47 |
| 2014/0063192 | A1 * | 3/2014 | Sonoda | G01B 11/2513 348/46 |
| 2015/0204662 | A1 * | 7/2015 | Kobayashi | G01B 11/25 356/610 |
| 2017/0241767 | A1 | 8/2017 | Miyata | |
| 2018/0365847 | A1 * | 12/2018 | Miyata | G06T 7/60 |
| 2019/0073782 | A1 * | 3/2019 | Matsuura | G06T 7/521 |
| 2020/0090356 | A1 * | 3/2020 | Miyata | G01B 11/25 |
| 2020/0334844 | A1 * | 10/2020 | Miyata | G06T 7/0004 |
| 2021/0224960 | A1 * | 7/2021 | Miyata | G06T 7/74 |
| 2024/0037765 | A1 * | 2/2024 | Zuo | G06T 7/337 |

* cited by examiner

THREE-DIMENSIONAL GEOMETRY MEASUREMENT APPARATUS, THREE-DIMENSIONAL GEOMETRY MEASUREMENT METHOD, AND STORAGE MEDIUM

CROSS-REFERENCE TO RELATED APPLICATIONS

The present application claims priority to Japanese Patent Application number 2023-125676, filed on Aug. 1, 2023. The contents of this application are incorporated herein by reference in their entirety.

BACKGROUND OF THE INVENTION

The present disclosure relates to a three-dimensional geometry measurement apparatus, a three-dimensional geometry measurement method, and a non-transitory storage medium storing a program.

A method has been proposed for measuring the geometry of an object to be measured without contacting it by projecting a projection pattern onto the object to be measured and analyzing a captured image obtained by capturing the object to be measured onto which the projection pattern is projected (see Japanese Unexamined Patent Application Publication 2017-146298, for example).

BRIEF SUMMARY OF THE INVENTION

In a three-dimensional geometry measurement apparatus described in Japanese Unexamined Patent Application Publication No. 2017-146298, in a case where an object to be measured is relatively large, it may not be possible to obtain a captured image of the entire object to be measured with a single capturing device, which may prevent measurement of the geometry of the entire object to be measured. In such cases, it is conceivable to obtain a plurality of pieces of three-dimensional geometry data by analyzing a plurality of captured images obtained with a plurality of image capturing devices in the three-dimensional geometry measurement apparatus. The three-dimensional geometry measurement apparatus measures the geometry of the entire object to be measured by aligning the plurality of pieces of three-dimensional geometry data. However, the alignment accuracy of the three-dimensional geometry data is reduced due to the influence of the passage of time, temperature changes, or the like. This reduction in the alignment accuracy leads to a decrease in the measurement accuracy of the geometry of the entire object to be measured. The alignment accuracy can be affected by aging or temperature changes in an instrument or the like used for alignment, for example.

The present disclosure has been made in view of these points, and its object is to prevent the acquisition of a three-dimensional geometry with reduced measurement accuracy, which is caused by alignment while the alignment accuracy of a plurality of pieces of three-dimensional geometry data generated on the basis of a plurality of captured images is reduced.

A three-dimensional geometry measurement apparatus according to a first aspect of the present disclosure includes: a projection part that projects, onto an object to be measured, a first striped projection image having a first pattern in which luminance changes along a first direction, and a second striped projection image having a second pattern in which luminance changes along a second direction that is different from the first direction; a first image capturing part that generates a first striped captured image by capturing the object to be measured while the first striped projection image is projected, and a second striped captured image by capturing the object to be measured while the second striped projection image is projected; a first identification part that identifies a primary absolute phase value corresponding to each of a plurality of pixels of the first image capturing part, on the basis of an image of the first pattern in the first striped captured image generated by the first image capturing part and an image of the second pattern in the second striped captured image generated by the first image capturing part; a second image capturing part that generates a first striped captured image by capturing the object to be measured while the first striped projection image is projected, and a second striped captured image by capturing the object to be measured while the second striped projection image is projected; a second identification part that identifies a secondary absolute phase value corresponding to each of a plurality of pixels of the second image capturing part, on the basis of an image of the first pattern in the first striped captured image generated by the second image capturing part and an image of the second pattern in the second striped captured image generated by the second image capturing part; a conversion identification part that identifies a conversion value for converting primary coordinates corresponding to the primary absolute phase value in a three-dimensional space, or secondary coordinates corresponding to the secondary absolute phase value that is equal to the primary absolute phase value so that the primary coordinates and the secondary coordinates become closer to each other in the three-dimensional space; and a geometry identification part that converts the primary coordinates or the secondary coordinates on the basis of the conversion value, and identifies a three-dimensional geometry of the object to be measured on the basis of the converted coordinates.

A three-dimensional geometry measurement apparatus according to a second aspect of the present disclosure includes: a projection part that projects, onto an object to be measured, a first striped projection image having a first pattern in which luminance changes along a first direction, and a second striped projection image having a second pattern in which luminance changes along a second direction; a first image capturing part that generates a first striped captured image by capturing the object to be measured while the first striped projection image is projected, and a second striped captured image by capturing the object to be measured while the second striped projection image is projected; a first identification part that identifies a primary absolute phase value corresponding to each of a plurality of pixels of the first image capturing part, on the basis of an image of the first pattern in the first striped captured image generated by the first image capturing part and an image of the second pattern in the second striped captured image generated by the first image capturing part; a second image capturing part that generates a first striped captured image by capturing the object to be measured while the first striped projection image is projected, and a second striped captured image by capturing the object to be measured while the second striped projection image is projected; a second identification part that identifies a secondary absolute phase value corresponding to each of a plurality of pixels of the second image capturing part, on the basis of an image of the first pattern in the first striped captured image generated by the second image capturing part and an image of the second pattern in the second striped captured image generated by the second image capturing part; a conversion identification part that identifies a conversion value for converting primary coordinates corresponding to the primary absolute phase value in a three-dimensional space, or secondary coordinates corresponding to the secondary absolute phase value that is equal to the primary absolute phase value so that the primary coordinates and the secondary coordinates become closer to each other in the three-dimensional space; a determination part that determines that misalignment has occurred between the primary coordinates and the secondary coordinates if the conversion value is larger than a predetermined reference value; and an output part that outputs a determination result from the determination part.

A three-dimensional geometry measurement method according to a third aspect of the present disclosure, executed by a computer, includes the steps of: projecting, onto an object to be measured, a first striped projection image having a first pattern in which luminance changes along a first direction; projecting, onto the object to be measured, a second striped projection image having a second pattern in which luminance changes along a second direction; generating, with a first image capturing part, a first striped captured image by capturing the object to be measured while the first striped projection image is projected, and a second striped captured image by capturing the object to be measured while the second striped projection image is projected; identifying a primary absolute phase value corresponding to each of a plurality of pixels of the first image capturing part, on the basis of an image of the first pattern in the first striped captured image generated by the first image capturing part and an image of the second pattern in the second striped captured image generated by the first image capturing part; generating, with a second image capturing part, a first striped captured image by capturing the object to be measured while the first striped projection image is projected, and a second striped captured image by capturing the object to be measured while the second striped projection image is projected; identifying a secondary absolute phase value corresponding to each of a plurality of pixels of the second image capturing part, on the basis of an image of the first pattern in the first striped captured image generated by the second image capturing part and an image of the second pattern in the second striped captured image generated by the second image capturing part; determining a conversion value for converting primary coordinates corresponding to the primary absolute phase value in a three-dimensional space, or secondary coordinates corresponding to the secondary absolute phase value that is equal to the primary absolute phase value so that the primary coordinates and the secondary coordinates become closer to each other in the three-dimensional space; and converting the primary coordinates or the secondary coordinates on the basis of the conversion value, thereby identifying a three-dimensional geometry of the object to be measured on the basis of the converted coordinates.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

First Embodiment

[Outline of the Three-Dimensional Geometry Measurement Apparatus 100]

Figure 1:
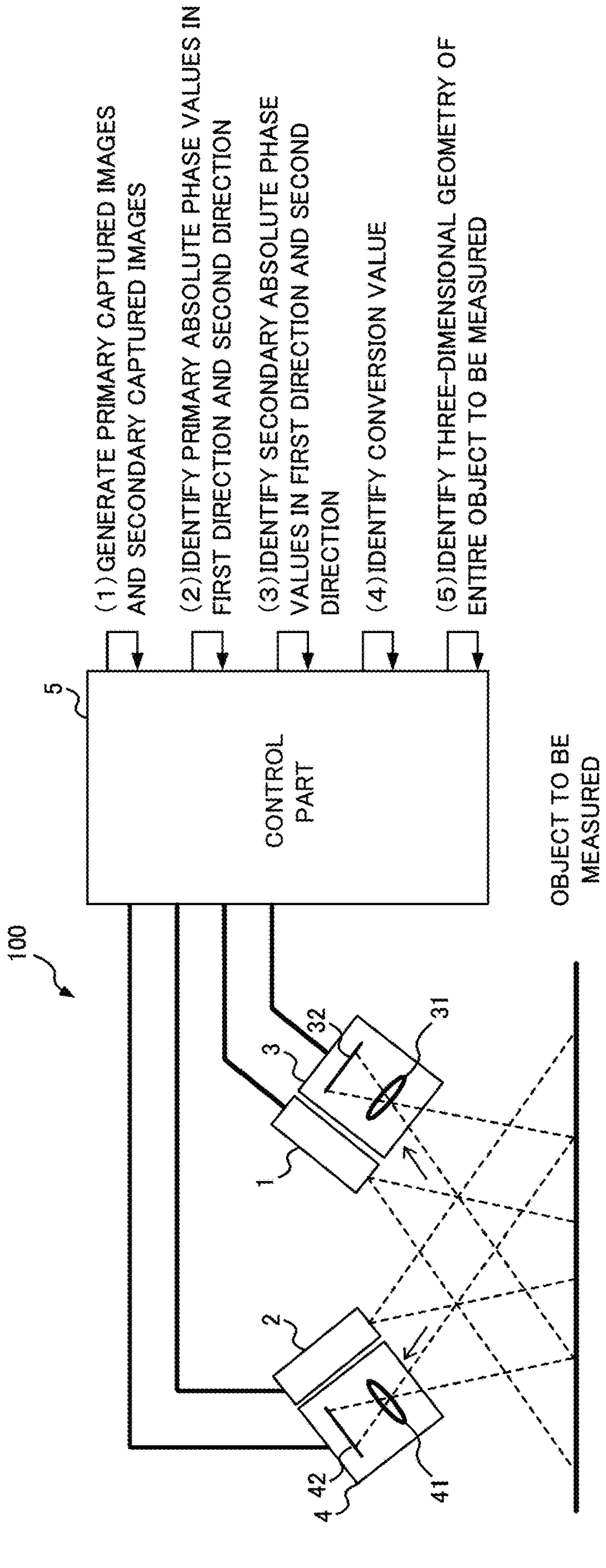
FIG. 1 is a diagram for explaining an outline of a three-dimensional geometry measurement apparatus according to a first embodiment.
Figure 2:
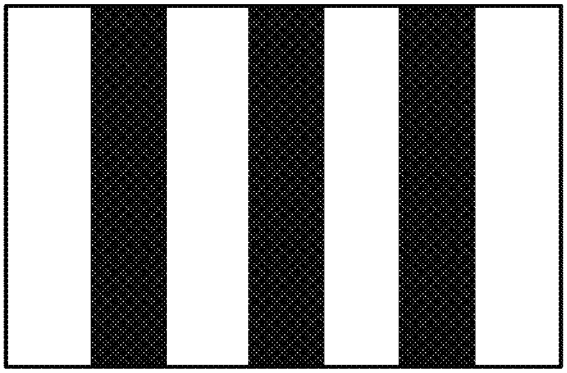
FIG. 2 shows an example of a projection image projected onto an object to be measured with the three-dimensional geometry measurement apparatus.

FIG. 1 is a diagram for explaining an outline of a three-dimensional geometry measurement apparatus 100 according to a first embodiment. FIG. 2 shows an example of a projection image projected onto an object to be measured with the three-dimensional geometry measurement apparatus 100. The three-dimensional geometry measurement apparatus 100 projects a projection image onto a measurement surface of the object to be measured with two projection parts, a first projection part 1 and a second projection part 2. The object to be measured is a target for measuring a three-dimensional geometry.

The three-dimensional geometry measurement apparatus 100 captures, with two image capturing parts that are a first image capturing part 3 and a second image capturing part 4, the object to be measured while a projection image that the first projection part 1 or the second projection part 2 projects is projected onto the object to be measured. The three-dimensional geometry measurement apparatus 100 optically measures the three-dimensional geometry of the object to be measured by analyzing a captured image generated by the three-dimensional geometry measurement apparatus 100.

The first projection part 1 and the second projection part 2 are projection devices having light sources such as a light emitting diode or a laser. The first projection part 1 projects, onto the object to be measured, a first striped projection image having a first pattern in which luminance changes along a first direction. FIG. 2 shows an example of the first striped projection image that the first projection part 1 or the second projection part 2 projects onto the object to be measured. The example of FIG. 2 shows the first striped projection image including a binary stripe pattern. The second projection part 2 projects, onto the object to be measured, a second striped projection image having a second pattern in which luminance changes along a second direction. The first direction and the second direction are directions orthogonal to each other on the object to be measured, for example, but may be directions that are not orthogonal to each other. The projection image is used as a marker for identifying three-dimensional coordinates of the object to be measured.

The first image capturing part 3 in FIG. 1 includes a lens 31 and an imaging element 32. The first image capturing part 3 generates a primary first striped captured image by capturing the object to be measured while the first striped projection image is projected. The first image capturing part 3 generates a primary second striped captured image by capturing the object to be measured while the second striped projection image is projected.

The second image capturing part 4 includes a lens 41 and an imaging element 42. The second image capturing part 4 generates a secondary first striped captured image by capturing the object to be measured while the first striped projection image is projected. The second image capturing part 4 generates a secondary second striped captured image by capturing the object to be measured while the second striped projection image is projected.

For example, in a case where the entire object to be measured cannot be captured with only the first image capturing part 3 due to the object to be measured being large or having a large number of irregularities, the second image capturing part 4 captures a portion that the first image capturing part 3 cannot capture. The first image capturing part 3 and the second image capturing part 4 generate the primary first striped captured image and the primary second striped captured image (hereinafter referred to as primary captured images), and the secondary first striped captured image and the secondary second striped captured image (hereinafter referred to as secondary captured images) so that a part of the object to be measured included in a primary captured image overlaps in a secondary captured image. At this time, a part of the image capturing range of the first image capturing part 3 and a part of the image capturing range of the second image capturing part 4 need not overlap with each other.

The control part 5 is implemented by a computer, for example. The control part 5 measures the geometry of the object to be measured on the basis of a plurality of captured images generated by the first image capturing part 3 and the second image capturing part 4. The control part 5 identifies three-dimensional coordinates by identifying a phase value of a pattern in each pixel of the projection image projected onto the object to be measured. The phase value indicates a progressive stage of a repetition cycle of the pattern in which luminance changes. The phase value indicates the same value for each cycle. An absolute phase value uniquely indicates the progressive stage of the repetition cycle of the pattern. The pattern is a stripe pattern, for example. The pattern may be a two-dimensional pattern such as a random pattern.

The control part 5 aligns three-dimensional geometry data of the object to be measured on the basis of the primary captured image captured by the first image capturing part 3, and three-dimensional geometry data of the object to be measured on the basis of the secondary captured image captured by the second image capturing part 4. Hereinafter, a procedure for performing alignment of i) the three-dimensional geometry data generated on the basis of the primary captured image generated by the first image capturing part 3 and ii) the three-dimensional geometry data generated on the basis of the secondary captured image generated by the second image capturing part 4, performed by the control part 5 will be described. The control part 5 generates the primary first striped captured image and the primary second striped captured image by capturing the object to be measured with the first image capturing part 3. The three-dimensional geometry measurement apparatus 100 generates the secondary first striped captured image and the secondary second striped captured image by capturing the object to be measured with the second image capturing part 4 ((1) in FIG. 1).

The control part 5 identifies primary absolute phase values of a plurality of pixels of the first image capturing part 3 in the first direction, on the basis of the image of the first pattern included in the primary first striped captured image. The control part 5 identifies primary absolute phase values of the plurality of pixels of the first image capturing part 3 in the second direction, on the basis of the image of the second pattern included in the primary second striped captured image ((2) in FIG. 1). The control part 5 identifies secondary absolute phase values of a plurality of pixels of the second image capturing part 4 in the first direction, on the basis of the image of the first pattern included in the secondary first striped captured image. The control part 5 identifies secondary absolute phase values of the plurality of pixels of the second image capturing part 4 in the second direction, on the basis of the image of the second pattern included in the secondary second striped captured image ((3) in FIG. 1).

The control part 5 identifies three-dimensional coordinates corresponding to the identified primary absolute phase value in at least one of the first direction or the second direction (hereinafter referred to as primary coordinates). The control part 5 identifies three-dimensional coordinates corresponding to the identified secondary absolute phase value in the first direction or the second direction (hereinafter referred to as secondary coordinates). Here, if the primary absolute phase value and the secondary absolute phase value match with each other, primary coordinates corresponding to this primary absolute phase value and secondary coordinates corresponding to this secondary absolute phase value should also match with each other. However, the primary coordinates and the secondary coordinates may not match with each other due to a measurement error in the first image capturing part 3 or the second image capturing part 4, because of the passage of time, temperature changes, or the like. Therefore, the control part 5 identifies a conversion value for converting the primary coordinates so that the primary coordinates corresponding to the primary absolute phase value in the three-dimensional space and the secondary coordinates corresponding to the secondary absolute phase value that is equal to the primary absolute phase value become closer to each other in the three-dimensional space ((4) in FIG. 1).

Next, the three-dimensional geometry measurement apparatus 100 generates, with the first image capturing part 3, a primary captured image obtained by capturing the object to be measured again and identifies a plurality of primary absolute phase values in the first direction and the second direction corresponding to this primary first striped captured image again. Similarly, the three-dimensional geometry measurement apparatus 100 generates, with the second image capturing part 4, a secondary captured image obtained by capturing the object to be measured again and identifies a plurality of secondary absolute phase values in the first direction and the second direction corresponding to this secondary captured image again.

The three-dimensional geometry measurement apparatus 100 converts a plurality of primary coordinates corresponding to the plurality of primary absolute phase values that have been identified again, on the basis of the conversion value. The three-dimensional geometry measurement apparatus 100 identifies the three-dimensional geometry of the entire object to be measured by connecting the plurality of converted primary coordinates to a plurality of secondary coordinates corresponding to the plurality of secondary absolute phase values that have been identified again ((5) in FIG. 1). In this manner, the control part 5 can prevent a decrease in the accuracy of alignment of the primary coordinates and the secondary coordinates due to the influence of the passage of time, temperature changes, or the like.

[Configuration of the Three-Dimensional Geometry Measurement Apparatus 100]

Figure 3:
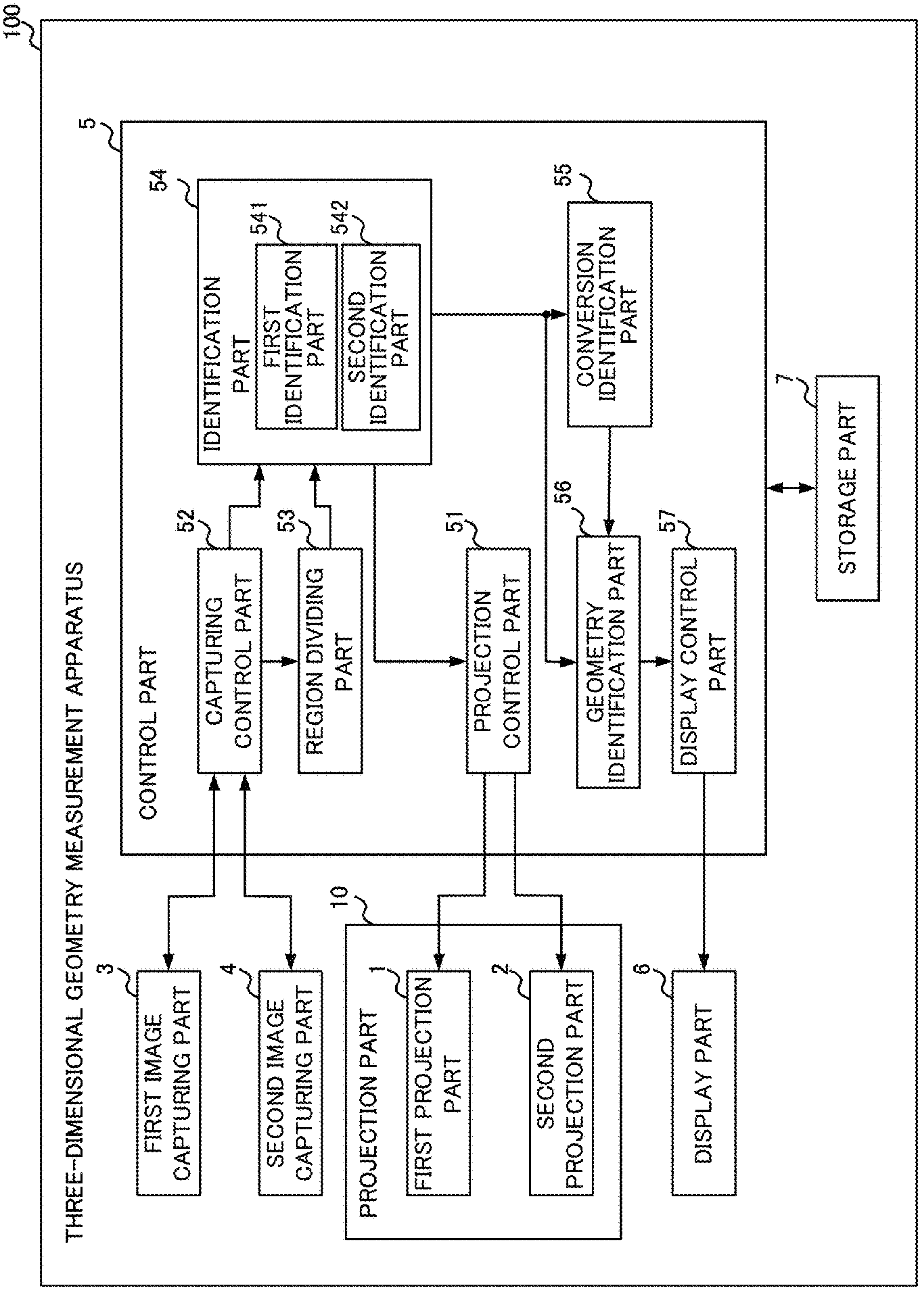
FIG. 3 shows a configuration of the three-dimensional geometry measurement apparatus.

FIG. 3 shows a configuration of the three-dimensional geometry measurement apparatus 100. The three-dimensional geometry measurement apparatus 100 includes the first image capturing part 3, the second image capturing part 4, the control part 5, a display part 6, a storage part 7, and a projection part 10. The control part 5 includes a projection control part 51, a capturing control part 52, a region dividing part 53, an identification part 54, a conversion identification part 55, a geometry identification part 56, and a display control part 57. The number of image capturing parts 3 and 4 and the number of projection parts 1 and 2 are not limited to two, and may be more.

The display part 6 is a display, for example. The display part 6 displays various types of information. The storage part 7 includes a storage medium such as a Read Only Memory (ROM), a Random Access Memory (RAM), and a hard disk. The storage part 7 stores a program executed by the control part 5.

The projection part 10 projects, onto the object to be measured, the first striped projection image having the first pattern in which luminance changes along the first direction and the second striped projection image having the second pattern in which luminance changes along the second direction. The projection part 10 includes the first projection part 1 and the second projection part 2.

The control part 5 is a Central Processing Unit (CPU), for example. The control part 5 functions as the projection control part 51, the capturing control part 52, the region dividing part 53, the identification part 54, the conversion identification part 55, the geometry identification part 56, and the display control part 57 by executing a program stored in the storage part 7.

The projection control part 51 controls the projection part 10 to project the first striped projection image or the second striped projection image onto the object to be measured. The projection control part 51 causes the first projection part 1 to project, onto the object to be measured, the first striped projection image having the first pattern in which luminance changes along the first direction. The projection control part 51 causes the second projection part 2 to project, onto the object to be measured, the second striped projection image having the second pattern in which luminance changes along the second direction. The second direction is a direction orthogonal to the first direction on the object to be measured, for example. The first direction and the second direction need not be orthogonal to each other.

Figure 4A:
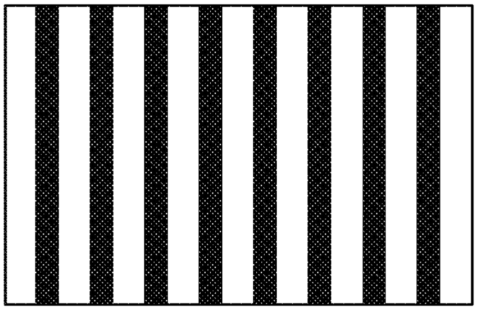
FIGS. 4A and 4B each show an example of a first striped projection image and a second striped projection image.
Figure 4B:
Figure 5A:
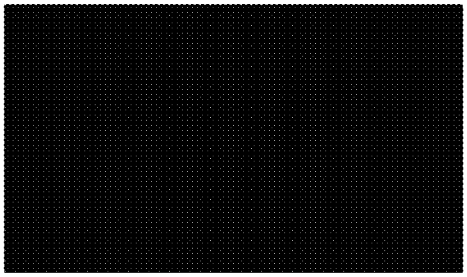
FIGS. 5A to 5F each show an example of the first striped projection image that a projection control part projects.
Figure 5B:
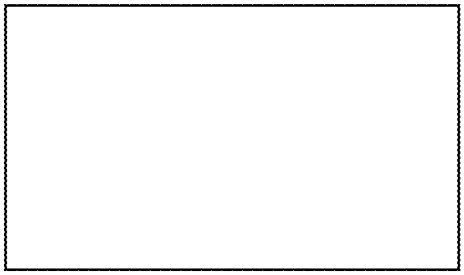
Figure 5C:
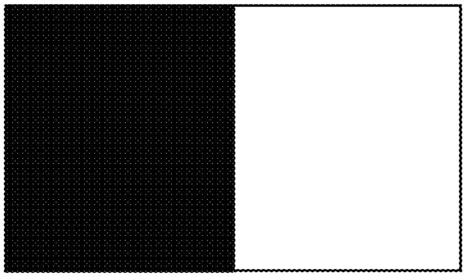
Figure 5D:
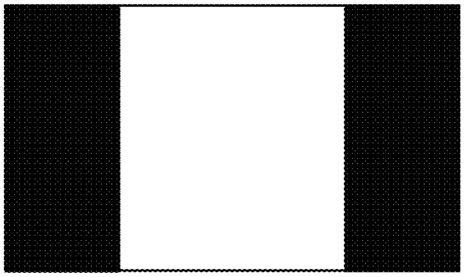
Figure 5E:
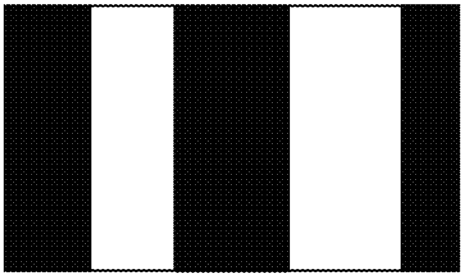
Figure 5F:
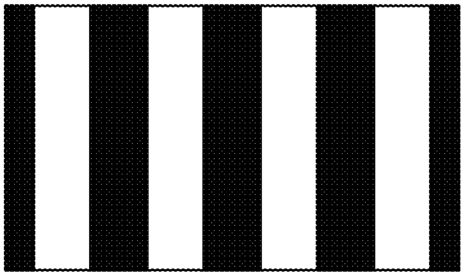
Figure 6A:
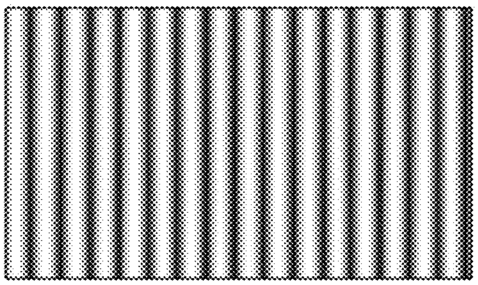
FIGS. 6A to 6D each show an example of the first striped projection image that the projection control part projects.
Figure 6B:
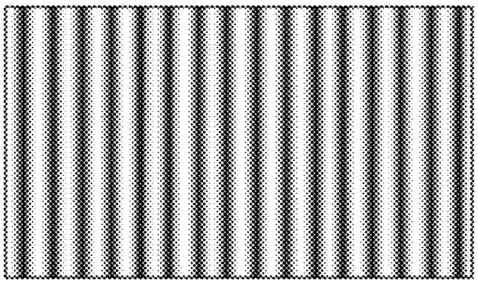
Figure 6C:
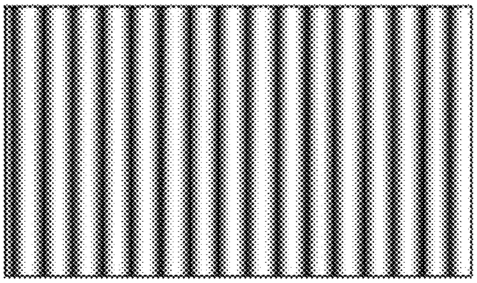
Figure 6D:
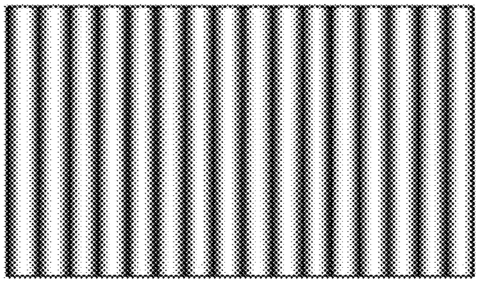

FIGS. 4A and 4B each show an example of the first striped projection image and the second striped projection image. FIG. 4A shows an example of the first striped projection image that the projection control part 51 causes the first projection part 1 to project. FIG. 4B shows an example of the second striped projection image that the projection control part 51 causes the second projection part 2 to project. The first striped projection image shown in FIG. 4A has the first pattern in which luminance changes along the horizontal direction, which is the first direction. The second striped projection image shown in FIG. 4B has the second pattern in which luminance changes along the vertical direction, which is the second direction.

In the examples of FIGS. 4A and 4B, the second direction forms a 90-degree angle with the first direction. The projection control part 51 may cause only the first projection part 1 or only the second projection part 2 to project the first striped projection image and the second striped projection image onto the object to be measured. The projection control part 51 may cause three or more projection parts to project the first striped projection image and the second striped projection image onto the object to be measured. As an example, if the projection control part 51 causes the first projection part 1, the second projection part 2, and a third projection part (not shown) to project the first striped projection image and the second striped projection image onto the object to be measured, the projection control part 51 may cause the first projection part 1 to project the first striped projection image, cause the second projection part 2 to project another first striped projection image, and cause the third projection part to project the second striped projection image. In addition to causing the first projection part 1 to project the first striped projection image and the second striped projection image onto the object to be measured, the projection control part 51 may also cause the second projection part 2 to project the first striped projection image and the second striped projection image onto the object to be measured.

FIGS. 5A to 5F and FIGS. 6A to 6D show examples of the first striped projection images that the projection control part 51 projects. FIGS. 5A to 5F show examples of binary stripe patterns. FIGS. 6A to 6D show examples of gradation stripe patterns having sinusoidal luminance distributions.

In the gradation stripe patterns of FIGS. 6A to 6D, shading changes in a sinusoidal manner from the white region to the black region along the width direction of the stripes.

The gradation stripe patterns of FIGS. 6A to 6D are different from each other in that the phases of the sine waves indicating the luminance distribution differ by 90 degrees from each other, and their luminance distributions are otherwise the same. The binary stripe pattern projected onto the object to be measured is analyzed by the identification part 54 using a space coding method. The gradation stripe pattern having a sinusoidal luminance distribution projected onto the object to be measured is analyzed by the identification part 54 using a phase shift method. By combining the analysis results of both patterns, an absolute phase value is calculated by the identification part 54 to be described later. In addition to the above-described patterns, any stripe pattern can be used. For example, a plurality of sinusoidal patterns having different cycles of stripes may be used.

Figure 7:
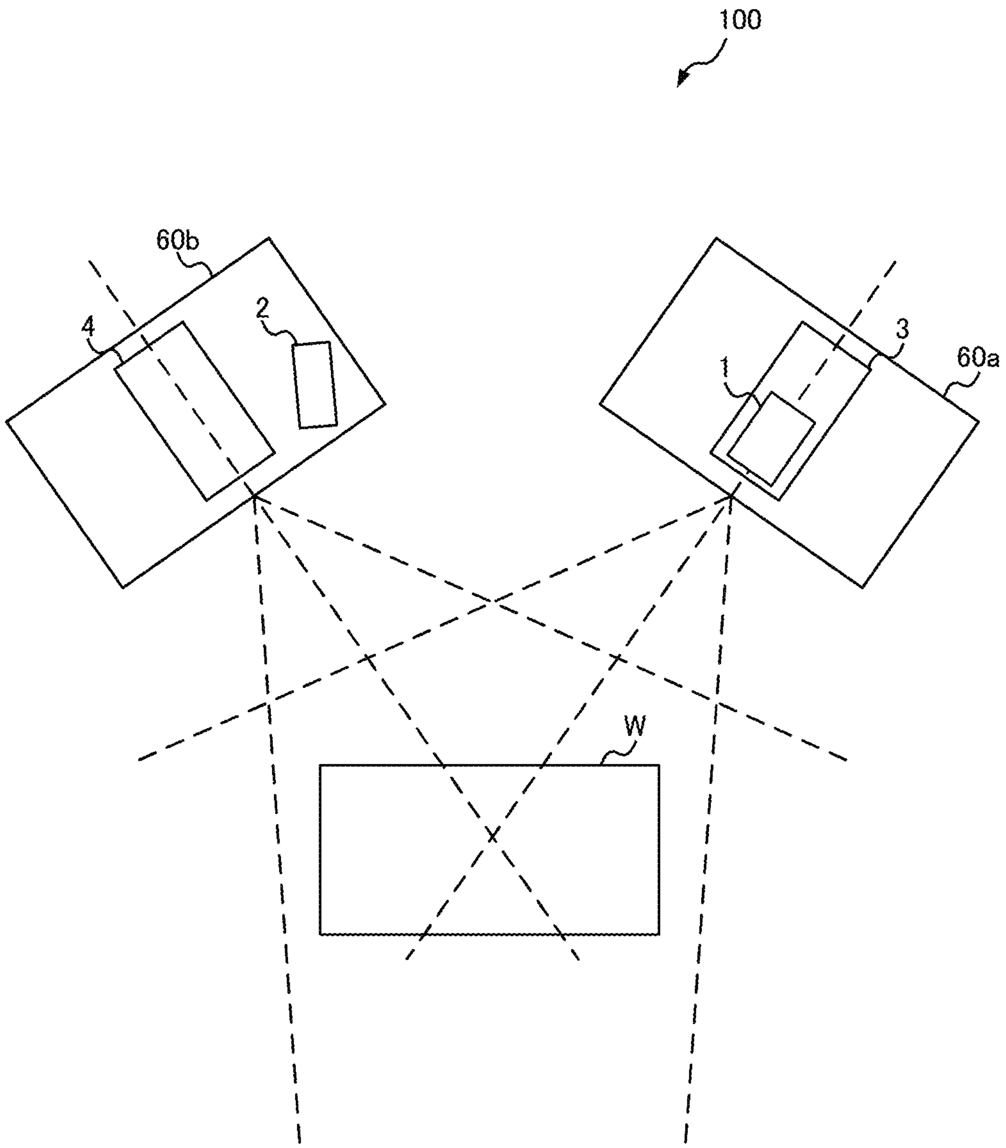
FIG. 7 shows another example of the arrangement of a first projection part and a second projection part.

FIG. 7 shows another example of the arrangement of the first projection part 1 and the second projection part 2. In the example of FIG. 7, the first image capturing part 3 and the first projection part 1 are housed in the same frame 60*a*. The second projection part 2 and the second image capturing part 4 are housed in the same frame 60*b*. In FIG. 7, W indicates the object to be measured. The broken lines in FIG. 7 indicate the optical axis and the outermost portion of the image capturing range or the like of the first image capturing part 3 or the second image capturing part 4. Further, in the three-dimensional geometry measurement apparatus 100, the number of image capturing parts or projection parts housed in one frame 60*a* or 60*b* may be increased. The geometry identification part 56 (to be described later) may respectively identify a plurality of three-dimensional geometries corresponding to a plurality of captured images captured with a plurality of image capturing parts housed in one frame, and align the plurality of identified three-dimensional geometries.

Figure 8A:
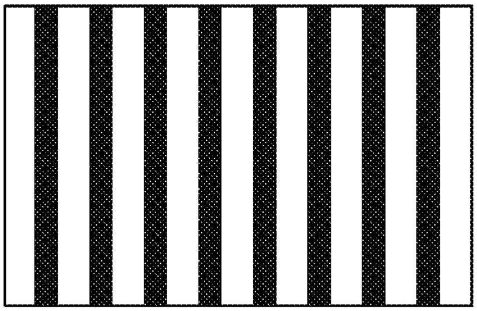
FIGS. 8A and 8B each show an example of the first striped projection image that the projection control part causes the first projection part to project.
Figure 8B:
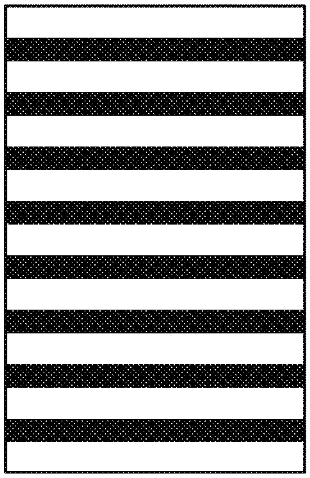

FIG. 8A shows an example of the primary projection image that the projection control part 51 causes the first projection part 1 to project. FIG. 8B shows an example of the secondary projection image that the projection control part 51 causes the second projection part 2 to project. In the example of FIG. 8B, the projection control part 51 causes the second projection part 2, which is oriented in a different direction from the first projection part 1, to project the same image as the first striped projection image shown in FIG. 8A onto the object to be measured. Due to this, in the state of FIG. 8B, where the same image as the first striped projection image is projected onto the object to be measured, the orientation of the stripes appears to be different from that of the first striped projection image shown in FIG. 8A. Further, the projection part 10 is not limited to the example of including the first projection part 1 and the second projection part 2, and may include more projection parts. In addition, the image capturing part, the projection part, and the frame housing the image capturing part or the projection part may be configured to be able to change their positions.

Figure 9:
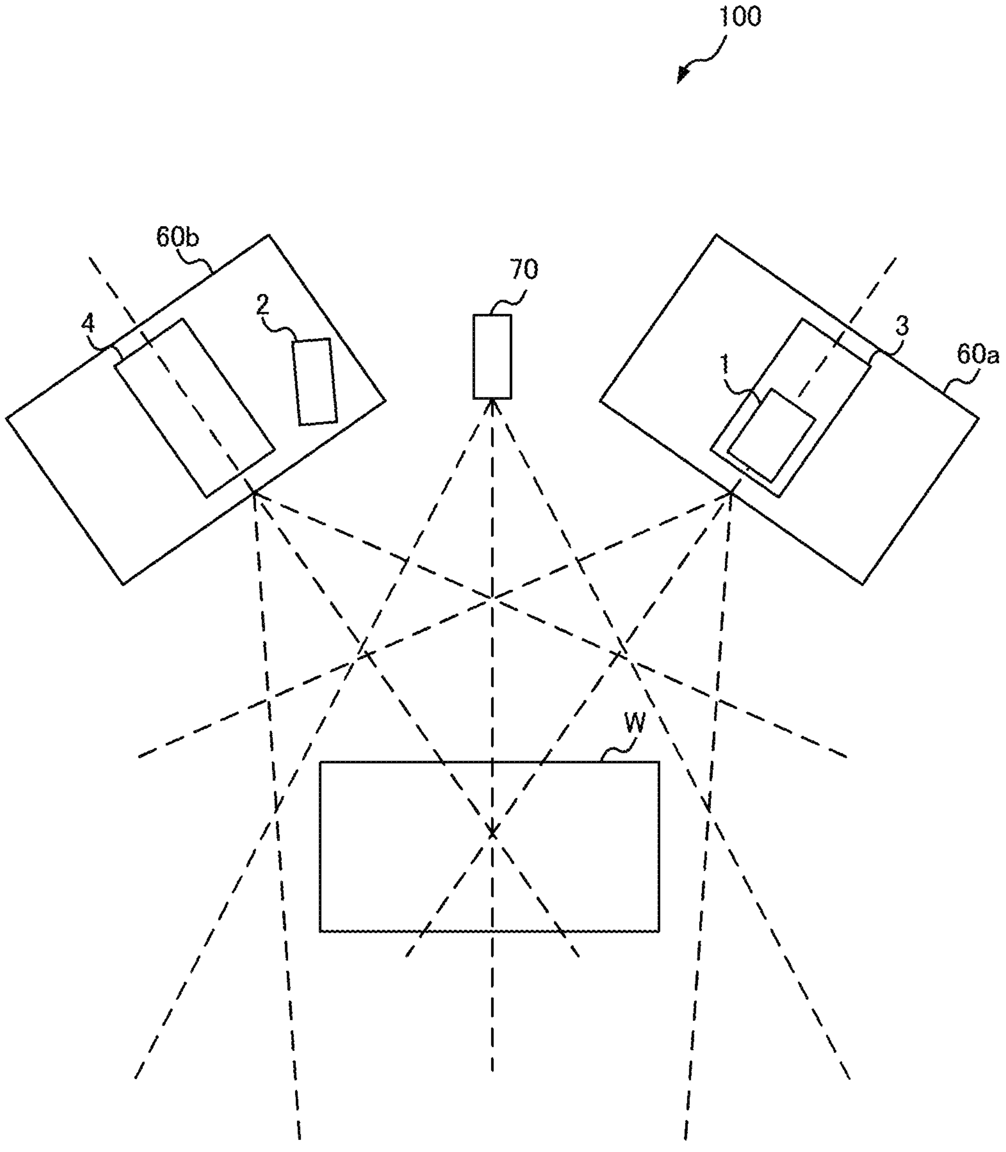
FIG. 9 shows another example of the arrangement of a plurality of projection parts.

FIG. 9 shows another example of the arrangement of a plurality of projection parts. In the example of FIG. 9, the three-dimensional geometry measurement apparatus 100 includes an auxiliary projection part 70, in addition to the first image capturing part 3 and the first projection part 1 housed in the frame 60*a* and the second projection part 2 and the second image capturing part 4 housed in the frame 60*b*. By increasing the number of projection parts, the three-dimensional geometry measurement apparatus 100 can prevent a shaded portion where the projection image is not projected from occurring on the object to be measured, and prevent the possibility of insufficiently ensuring the parallax between the image capturing part and the projection part.

Figure 10:
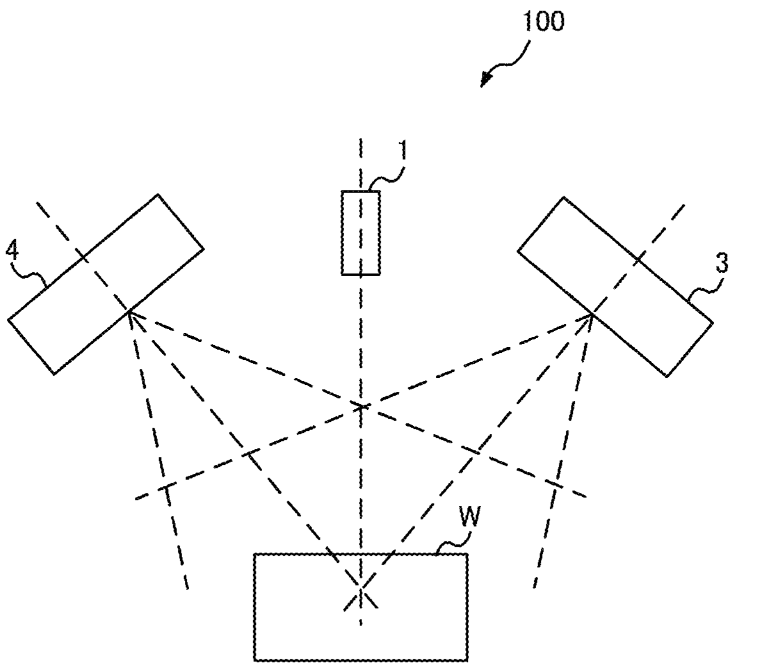
FIG. 10 shows another configuration example of the three-dimensional geometry measurement apparatus.

The projection part 10 is not limited to the example of including the first projection part 1 and the second projection part 2, and may include one of the first projection part 1 and the second projection part 2. FIG. 10 shows a configuration example of the three-dimensional geometry measurement apparatus 100 in which the projection part 10 includes only the first projection part 1. The first projection part 1 projects, onto the object to be measured W, the first striped projection image having the first pattern in which luminance changes along the first direction. The first projection part 1 also projects, onto the object to be measured W, the second striped projection image having the second pattern in which luminance changes along the second direction. The projection control part 51 may control the projection part 10 to project, onto the object to be measured W, projection images including stripe patterns, where the directions in which the stripe patterns extend differ from each other across a plurality of instances of measurement. In the three-dimensional geometry measurement apparatus 100, the first projection part 1, the second projection part 2, and the first image capturing part 3 may be housed in one frame.

The capturing control part 52 generates a captured image obtained by capturing the object to be measured with the first image capturing part 3 or the second image capturing part 4. The capturing control part 52 generates the primary first striped captured image by capturing, with the first image capturing part 3, the object to be measured while the first striped projection image is projected. The capturing control part 52 generates the secondary first striped captured image by capturing, with the second image capturing part 4, the object to be measured while the first striped projection image is projected. The capturing control part 52 generates the primary second striped captured image by capturing, with the first image capturing part 3, the object to be measured while the second striped projection image is projected. The capturing control part 52 generates the secondary second striped captured image by capturing, with the second image capturing part 4, the object to be measured while the second striped projection image is projected.

The capturing control part 52 may generate a plurality of primary captured images with the first image capturing part 3 over a plurality of instances of measurement. The capturing control part 52 may generate a plurality of secondary captured images with the second image capturing part 4 over a plurality of instances of measurement. The capturing control part 52 outputs the generated first striped captured image and second striped captured image to the region dividing part 53 and the identification part 54.

Figure 11:
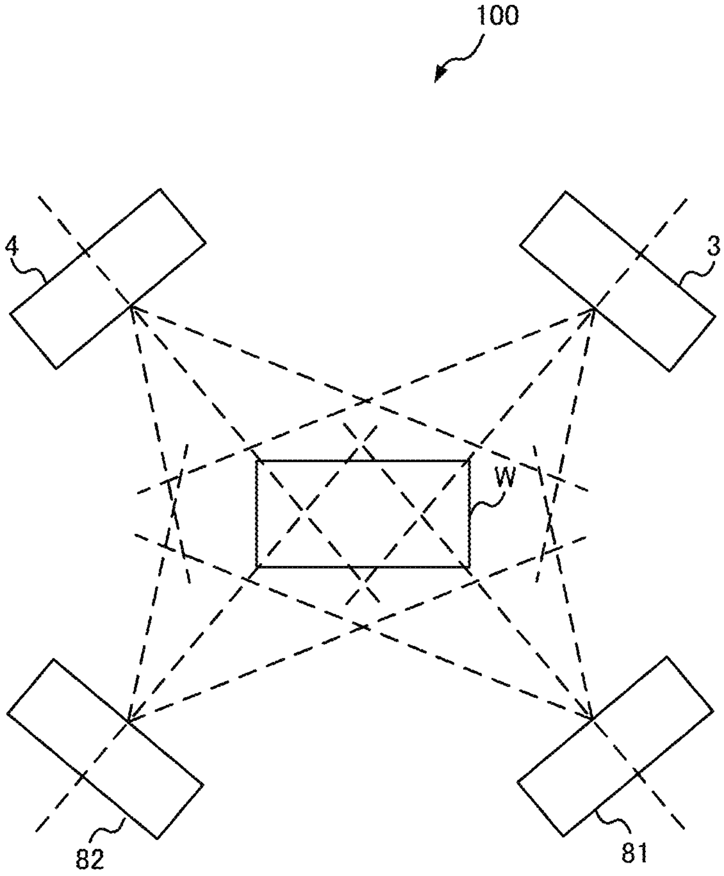
FIG. 11 shows still another configuration example of the three-dimensional geometry measurement apparatus.

The capturing control part 52 may generate a captured image using an additional image capturing part, in addition to the first image capturing part 3 and the second image capturing part 4. FIG. 11 shows a configuration example of the three-dimensional geometry measurement apparatus 100 having additional image capturing parts. The three-dimensional geometry measurement apparatus 100 includes a third image capturing part 81 and a fourth image capturing part 82 in addition to the first image capturing part 3 and the second image capturing part 4. The capturing control part 52 generates the primary first striped captured image by capturing, with the first image capturing part 3, the object to be measured W while the first striped projection image is projected. The capturing control part 52 generates the secondary first striped captured image by capturing, with the second image capturing part 4, the object to be measured W while the first striped projection image is projected. The capturing control part 52 generates a tertiary first striped captured image by capturing, with the third image capturing part 81, the object to be measured W while the first striped projection image is projected. The capturing control part 52 generates a quaternary first striped captured image by capturing, with the fourth image capturing part 82, the object to be measured W while the first striped projection image is projected.

Further, the three-dimensional geometry measurement apparatus 100 may include a first frame, a second frame, a third frame, and a fourth frame instead of the first image capturing part 3, the second image capturing part 4, the third image capturing part 81, and the fourth image capturing part 82. The first frame to fourth frame may respectively include one or more image capturing parts and one or more projection parts.

The capturing control part 52 generates the primary second striped captured image by capturing, with the first image capturing part 3, the object to be measured W while the second striped projection image is projected. The capturing control part 52 generates the secondary second striped captured image by capturing, with the second image capturing part 4, the object to be measured W while the second striped projection image is projected. The capturing control part 52 generates a tertiary second striped captured image by capturing, with the third image capturing part 81, the object to be measured W while the second striped projection image is projected. The capturing control part 52 generates a quaternary second striped captured image by capturing, with the fourth image capturing part 82, the object to be measured W while the second striped projection image is projected. In this manner, since the number of captured images used for identifying the three-dimensional geometry of the object to be measured can be increased, the capturing control part 52 can improve the measurement accuracy of triangulation.

The region dividing part 53 divides a three-dimensional region including a plurality of three-dimensional coordinates of the object to be measured, into a plurality of partial regions. First, the region dividing part 53 identifies a plurality of primary coordinates corresponding to the plurality of primary absolute phase values identified by a first identification part 541. The region dividing part 53 identifies a three-dimensional region including the plurality of identified primary coordinates, and divides this three-dimensional region into a plurality of primary partial regions.

Similarly, the region dividing part 53 divides a three-dimensional region including a plurality of secondary coordinates corresponding to the plurality of secondary absolute phase values identified by a second identification part 542, into a plurality of secondary partial regions. At this time, the region dividing part 53 matches the three-dimensional region before the division including the plurality of primary coordinates with the three-dimensional region before the division including the plurality of secondary coordinates. For example, the region dividing part 53 divides each of the three-dimensional regions so that a boundary for dividing the three-dimensional region including the plurality of primary coordinates and a boundary for dividing the three-dimensional region including the plurality of secondary coordinates match with each other. The boundaries between the primary coordinate side and the secondary coordinate side need not necessarily match with each other, as long as a region on the primary coordinate side and a region on the secondary coordinate side partially overlap with each other.

Further, the region dividing part 53 may divide a three-dimensional region designated by a user. The three-dimensional region may have any shape such as a round or a rectangular. The region dividing part 53 may divide only a three-dimensional region that the user is interested in so that alignment is performed between primary coordinates included in the divided primary partial region and corresponding secondary coordinates. The region dividing part 53 is not limited to the example of dividing the three-dimensional region including the primary coordinates or the secondary coordinates. For example, the region dividing part 53 may form a plurality of primary partial regions by dividing at least a part of the primary captured image. The region dividing part 53 may form a plurality of secondary partial regions by dividing at least a part of the secondary captured image.

Similarly, the region dividing part 53 divides the image of the object to be measured included in the secondary first striped captured image into a plurality of images of the secondary first striped partial region. The region dividing part 53 divides the image of the object be measured included in the secondary second striped captured image into a plurality of images of the secondary second striped partial region, respectively at the same boundary line as each boundary line of a plurality of regions generated by dividing the secondary first striped captured image. The region dividing part 53 outputs, to the identification part 54, information indicating the plurality of divided primary partial regions and the plurality of divided secondary partial regions.

[Identification of Absolute Phase Values]

Figure 12:
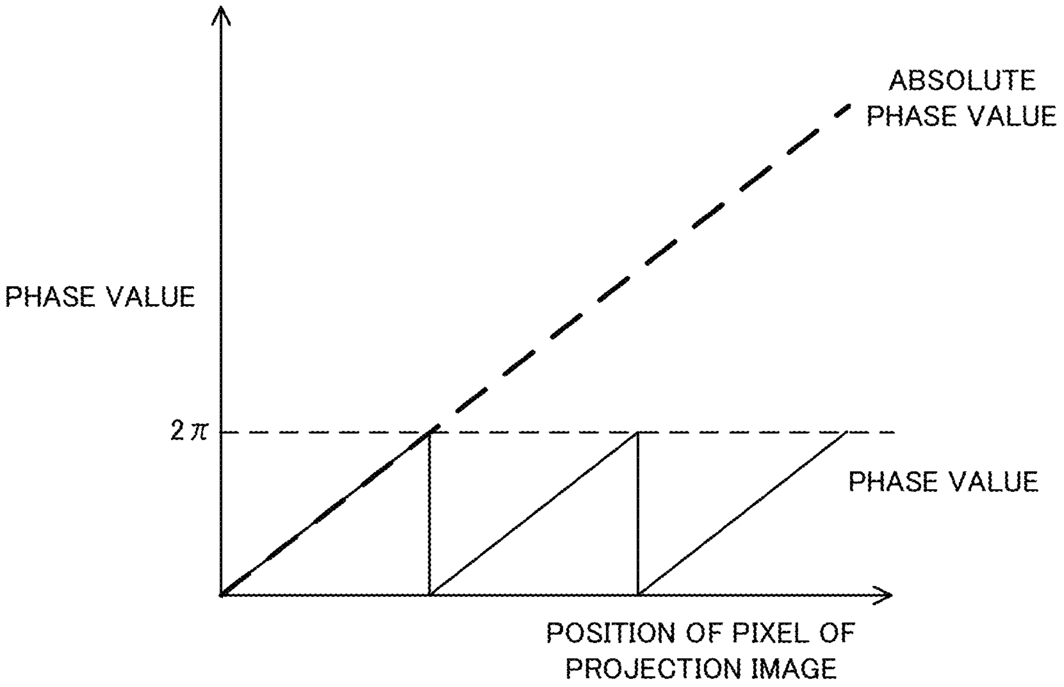
FIG. 12 shows a relationship between a phase value and an absolute phase value.

The identification part 54 identifies an absolute phase value of the pattern of the first striped projection image or the second striped projection image included in each pixel of the primary captured image or the secondary captured image. FIG. 12 shows a relationship between a phase value and an absolute phase value. The vertical axis in FIG. 12 indicates the phase value or the absolute phase value. The horizontal axis in FIG. 12 indicates the position of a pixel of a projection image. The solid line in FIG. 12 indicates the phase value, and the broken line in FIG. 12 indicates the absolute phase value. The phase value indicates a progressive stage of a repetition cycle of the pattern in which luminance changes. The phase value indicates the same value for each cycle. The absolute phase value is a value for uniquely identifying a progressive stage of the repetition cycle of the pattern without repeating the same value in different cycles.

The identification part 54 includes the first identification part 541 and the second identification part 542. The first identification part 541 identifies a primary absolute phase value in the first direction corresponding to each of a plurality of pixels of the first image capturing part 3, on the basis of the image of the first pattern in the primary first striped captured image. The first identification part 541 identifies a primary absolute phase value in the second direction corresponding to each of the plurality of pixels of the first image capturing part 3, on the basis of the image of the second pattern in the primary second striped captured image.

For example, if the projection control part 51 projects the first striped projection images of FIGS. 5A to 5F and FIGS. 6A to 6D onto the object to be measured W, the first identification part 541 identifies absolute phase values by identifying the luminance of pixels of the respective first striped projection images that have been projected. For example, a primary absolute phase value $I_{AP,S1}(i_{s1},j_{s1})$ is represented by the following equation (1).

$$I_{AP,s1}(i_{s1},j_{s1}) = (I_{AP,s1,1}(i_{s1},j_{s1}), I_{AP,s1,2}(i_{s1},j_{s1})) \quad (1)$$

$(i_{s1}, j_{s1})$ represents coordinates of a pixel of the first image capturing part 3. $I_{AP,s1,1}(i_{s1},j_{s1})$ represents the primary absolute phase value of the pixel of the first image capturing part 3 in the first direction. $I_{AP,s1,2}(i_{s1},j_{s1})$ represents the primary absolute phase value of the pixel of the first image capturing part 3 in the second direction.

Similarly, the second identification part 542 identifies a secondary absolute phase value in the first direction corresponding to each of the plurality of pixels of the second image capturing part 4, on the basis of the image of the first pattern in the secondary first striped captured image. The second identification part 542 identifies a secondary absolute phase value in the second direction corresponding to each of the plurality of pixels of the second image capturing part 4, on the basis of the image of the second pattern in the secondary second striped captured image. For example, a secondary absolute phase value $I_{AP,S2}(i_{s2},j_{s2})$ is represented by the following equation (2).

$$I_{AP,s2}(i_{s2}, j_{s2}) = (I_{AP,s2,1}(i_{s2}, j_{s2}), I_{AP,s2,2}(i_{s2}, j_{s2})) \quad (2)$$

$(i_{s2}, j_{s2})$ represents coordinates of a pixel of the second image capturing part 4. $I_{AP,s2,1}(i_{s2},j_{s2})$ represents the secondary absolute phase value of the pixel of the second image capturing part 4 in the first direction. $I_{AP,s2,2}(i_{s2},j_{s2})$ represents the secondary absolute phase value of the pixel of the second image capturing part 4 in the second direction.

If the region dividing part 53 divides the image of the object to be measured included in the primary first striped captured image into a plurality of images of a primary first striped partial region, the first identification part 541 identifies a plurality of primary absolute phase values in the first direction corresponding to each of a plurality of pixels of the image of the primary first striped partial region. If the region dividing part 53 divides the image of the object to be measured included in the primary second striped captured image into a plurality of images of a primary second striped partial region, the first identification part 541 identifies a plurality of primary absolute phase values in the second direction corresponding to each of a plurality of pixels of the image of primary second striped partial region.

If the region dividing part 53 divides the image of the object to be measured included in the secondary first striped captured image into a plurality of images of the secondary first striped partial region, the second identification part 542 identifies a plurality of secondary absolute phase values in the first direction corresponding to each of a plurality of pixels of the image of the secondary first striped partial region. If the region dividing part 53 divides the image of the object to be measured included in the secondary second striped captured image into a plurality of images of the secondary second striped partial region, the second identification part 542 identifies a plurality of secondary absolute phase values in the second direction corresponding to each of a plurality of pixels of the image of the secondary second striped partial region.

If the capturing control part 52 generates a plurality of primary first striped captured images over a plurality of instances of measurement, the first identification part 541 may respectively identify a plurality of primary absolute phase values in the first direction corresponding to the plurality of first striped captured images. The first identification part 541 may respectively identify a plurality of primary absolute phase values in the second direction over a plurality of instances of measurement. Similarly, the second identification part 542 may respectively identify a plurality of primary absolute phase values in the first direction over a plurality of instances of measurement. The second identification part 542 may respectively identify a plurality of secondary absolute phase values in the second direction over a plurality of instances of measurement.

[Identification of a Degree of Reliability]

The first identification part 541 extracts a primary feature amount in the first direction from the primary first striped captured image. The first identification part 541 identifies a primary degree of reliability in the first direction indicating reliability of the primary absolute phase value in the first direction, on the basis of the extracted primary feature amount in the first direction. For example, a luminance value or the like of a pixel of the first striped captured image can be used as the primary feature amount.

More specifically, the first identification part 541 identifies, as the primary feature amount, a difference or a ratio between i) the luminance of any pixel of the primary captured image while light is projected onto the entire object to be measured, and ii) the luminance of the same pixel of the captured image while light is not projected onto the object to be measured. The first identification part 541 determines a primary degree of reliability of a pixel included in the primary captured image on the basis of the value of the primary feature amount. As an example, the first identification part 541 assigns a higher primary degree of reliability to the pixel as the value of the primary feature amount increases.

For example, if the identified difference is equal to or greater than a threshold, the first identification part 541 assigns a relatively high primary degree of reliability to this pixel. In contrast, if the identified difference is less than the threshold, the first identification part 541 assigns a relatively low primary degree of reliability to this pixel. The threshold is determined by obtaining a relationship between a degree of reliability and a measurement error in advance, for example.

The first identification part 541 may identify, as the primary feature amount, a luminance value or the like extracted from a plurality of binary stripe patterns. For example, the first identification part 541 may assign a relatively high primary degree of reliability to a plurality of pixels in the primary partial region, if a difference value between the maximum and the minimum of luminance values of the plurality of binary stripe patterns for the same pixel is equal to or greater than a predetermined amount. The first identification part 541 may assign a relatively low primary degree of reliability to the plurality of pixels in the primary partial region if the difference value between the maximum and the minimum of luminance values of the plurality of binary stripe patterns is less than the predetermined amount.

Further, if the projection control part 51 projects a gradation stripe pattern having a sinusoidal luminance distribution onto the object to be measured W, the first identification part 541 may identify, as the primary feature amount, the amplitude of the sine wave, the offset of the sine wave, the contrast of the sine wave, the waveform distortion of the sine wave, and the like for individual pixels. The offset indicates an average value of luminance in the gradation stripe pattern having a sinusoidal luminance distribution. This contrast is obtained by the following equation (3).

$$(\text{contrast}) = (\text{half amplitude of a sine wave})/(\text{offset of a sine wave}) \quad (3)$$

If a plurality of stripe patterns of the sine wave, with phases differing from each other and cycles that are the same, are projected onto the object to be measured, the luminance values of the plurality of stripe patterns of the sine wave observed at a specific pixel position differ depending on the plurality of stripe patterns of the sine wave that have been projected. Ideally, change over time of the luminance values becomes a sine wave, but deviation from the sine wave occurs due to the generation of noise or the like. In an image of different stripe patterns of the sine wave, which has been observed at the same pixel position, if change over time of the luminance value of the stripe pattern corresponding to this pixel position is identified as a signal waveform, the waveform distortion of the sine wave indicates an amount by which the signal waveform is distorted from an ideal sine wave.

For example, if a plurality of gradation stripe patterns of the sine wave, with phases differing by 90 degrees, are projected onto the object to be measured, the phases corresponding to the luminance of stripe patterns projected onto the same pixel should differ by 90 degrees, but the phases corresponding to an observed value of the luminance of the stripe patterns at this pixel may not differ by 90 degrees due to the influence of distortion. For example, the first identification part 541 identifies a deviation between i) the value at the time when the observed value of this pixel is applied to a sine wave and ii) the observed value of this pixel, and identifies the waveform distortion of the gradation stripe pattern of the sine wave as the primary feature amount, on the basis of the identified deviation.

The first identification part 541 may identify the value of these primary feature amounts as the primary degree of reliability of the pixel substantially as-is. Further, the first identification part 541 may determine the primary degree of reliability on the basis of the value of the primary feature amount, or may determine the primary degree of reliability on the basis of values of a plurality of primary feature amounts. For example, if the amplitude or the offset of the luminance of the identified pixel is within a predetermined range, the first identification part 541 may assign a relatively high primary degree of reliability to this pixel. In contrast, the first identification part 541 may assign a relatively low primary degree of reliability to this pixel if the amplitude or the offset of the luminance of the identified pixel is larger than the maximum value of the predetermined range, and if the amplitude or the offset of the luminance of the identified pixel is smaller than the minimum value of the predetermined range.

Similarly, the first identification part 541 extracts a primary feature amount in the second direction from the primary second striped captured image. The first identification part 541 identifies a primary degree of reliability in the second direction indicating reliability of the primary absolute phase value in the second direction, on the basis of the extracted primary feature amount in the second direction. The second identification part 542 extracts a secondary feature amount in the first direction from the secondary first striped captured image. The second identification part 542 identifies a secondary degree of reliability in the first direction indicating reliability of the secondary absolute phase value in the first direction, on the basis of the extracted secondary feature amount in the first direction. The second identification part 542 extracts a secondary feature amount in the second direction from the secondary second striped captured image. The second identification part 542 identifies a secondary degree of reliability in the second direction indicating reliability of the secondary absolute phase value in the second direction, on the basis of the extracted secondary feature amount in the second direction.

The first identification part 541 may identify a primary degree of reliability of individual pixels on the basis of the primary feature amount in either the first direction or the second direction, or may identify a primary degree of reliability of individual pixels on the basis of the primary feature amounts in both the first direction and the second direction.

Similarly, the second identification part 542 may identify a secondary degree of reliability of individual pixels on the basis of the secondary feature amount in either the first direction or the second direction, or may identify the secondary degree of reliability of individual pixels on the basis of feature amounts in both the first direction and the second direction. The first identification part 541 and the second identification part 542 may identify the degree of reliability on the basis of various feature amounts that can be identified from a captured image, a phase value or three-dimensional coordinates of the stripe pattern, or the like by a known technique.

[Identification of a Conversion Value]

Figure 13:
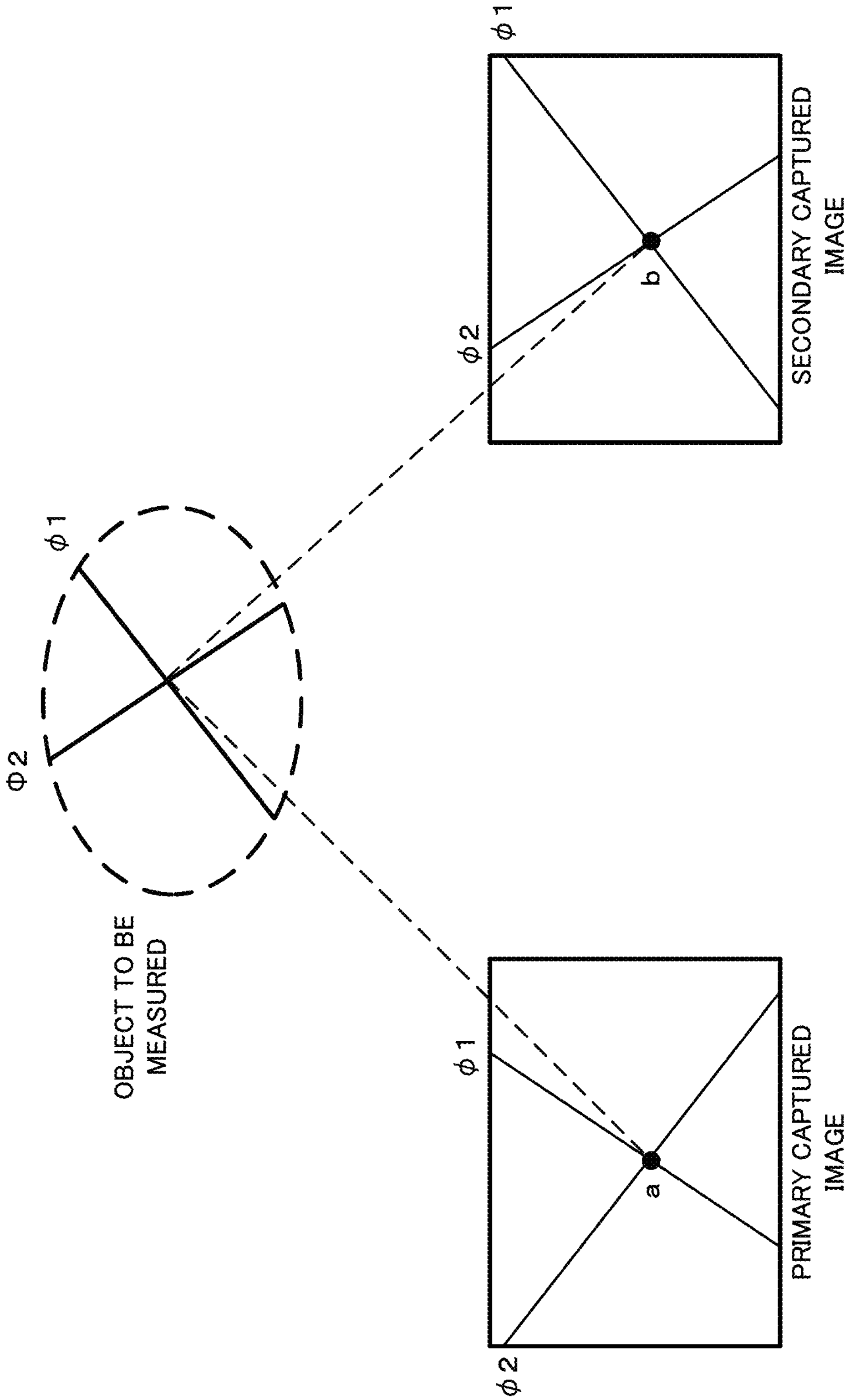
FIG. 13 shows an example of a method of identifying a primary absolute phase value and a secondary absolute phase value.

The conversion identification part 55 identifies a conversion value for converting i) primary coordinates that are three-dimensional coordinates corresponding to primary absolute phase values in the first direction and the second direction identified by the first identification part 541, or ii) secondary coordinates that are three-dimensional coordinates corresponding to secondary absolute phase values in the first direction and the second direction identified by the second identification part 542. FIG. 13 shows an example of a method of identifying a primary absolute phase value and a secondary absolute phase value. The object to be measured is indicated by the broken-line ellipse in FIG. 13. FIG. 13 shows a stripe φ1 of the first pattern included in the first projection image projected onto the object to be measured, and a stripe φ2 of the second pattern included in the second projection image projected onto the object to be measured.

The first image capturing part 3 and the second image capturing part 4 generate the primary captured image and the secondary captured image obtained by capturing the object to be measure. In the example of FIG. 13, the first identification part 541 identifies a primary absolute phase value in the first direction corresponding to the stripe φ1, in the primary captured image on the left side obtained by capturing the object to be measured. The first identification part 541 identifies a primary absolute phase value in the second direction corresponding to the stripe φ2 in this primary captured image.

The second identification part 542 identifies a secondary absolute phase value in the first direction corresponding to the stripe φ1, in the secondary captured image on the right side obtained by capturing the object to be measured. The second identification part 542 identifies a secondary absolute phase value in the second direction corresponding to φ2 in this secondary captured image. Here, the intersection point (a) between the stripe φ1 and the stripe φ2 in the primary captured image corresponds to the same three-dimensional coordinates, on the object to be measured, as the intersection point (b) between the stripe φ1 and the stripe φ2 in the secondary captured image. Therefore, the conversion identification part 55 identifies a pair of the primary coordinates and the secondary coordinates corresponding to the same absolute phase value, and identifies a conversion value for aligning the primary coordinates and the secondary coordinates in the identified pair.

The conversion identification part 55 may output an error if the number of the identified pairs of the primary coordinates and the secondary coordinates is less than a reference value due to reasons such as the small size of the object to be measured. The reference value is determined in accordance with the maximum value of allowable measurement errors in the measurement of the three-dimensional geometry, for example.

For example, the conversion identification part 55 may output, to the display part 6 as an error, a message notifying the user that another member needs to be placed around the object to be measured within a range in which the first striped projection image and the second striped projection image are projected. The user places another member within the range in which the first striped projection image and the second striped projection image are projected, and therefore the first striped projection image and the second striped projection image are also projected onto this member. This makes it possible to increase the number of pairs of the primary coordinates and the secondary coordinates corresponding to the same absolute phase value, to a number that is equal to or greater than the reference value.

Hereinafter, the operation of the conversion identification part 55 will be described in detail. First, among a plurality of primary absolute phase values $I_{AP,S1}$ $(i_{s1}, j_{s1})$ identified by the first identification part 541 and a plurality of secondary absolute phase values $I_{AP,S2}$ $(i_{s2}, j_{s2})$ identified by the second identification part 542, the conversion identification part 55 identifies a pair in which a primary absolute phase value $I_{AP,S1}$ $(i_{s1}, j_{s1})$ and a secondary absolute phase value $I_{AP,S2}$ $(i_{s2}, j_{s2})$ are equal. In the identified pair, the conversion identification part 55 calibrates primary coordinates or secondary coordinates so that primary coordinates $P_{s1}$ $(i_{s1}, j_{s1})$ on the object to be measured W or the like corresponding to the primary absolute phase value $I_{AP,S1}$ $(i_{s1}, j_{s1})$ in the three-dimensional space, and secondary coordinates $P_{s2}$ $(i_{s2}, j_{s2})$ on the object to be measured W or the like corresponding to the secondary absolute phase value $I_{AP,S2}$ $(i_{s2}, j_{s2})$ become closer to each other in the three-dimensional space.

In the example of the present specification, the conversion identification part 55 identifies a conversion value for converting the primary coordinates or the secondary coordinates so that the primary coordinates and the secondary coordinates become closer to each other in the three-dimensional space. The conversion value includes a translation amount by which the primary coordinates are translated in order to match the primary coordinates to the secondary coordinates, and a rotation amount by which the primary coordinates are rotated in order to match the primary coordinates to the secondary coordinates.

If the first identification part 541 identifies a plurality of primary absolute phase values corresponding to the respective pixels of the plurality of primary partial regions, the conversion identification part 55 identifies a plurality of primary coordinates corresponding to the plurality of primary absolute phase values in the three-dimensional space. Similarly, if the second identification part 542 identifies a plurality of secondary absolute phase values corresponding to the respective pixels of the plurality of secondary partial regions, the conversion identification part 55 identifies a plurality of secondary coordinates corresponding to the plurality of secondary absolute phase values in the three-dimensional space. The conversion identification part 55 identifies a plurality of pairs in which the primary absolute phase value and the secondary absolute phase value are equal to each other.

For each of the plurality of identified pairs, the conversion identification part 55 may identify a conversion value for converting the plurality of primary coordinates or the plurality of secondary coordinates so that the primary coordinates corresponding to the primary absolute phase value of any one pair and the secondary coordinates corresponding to the secondary absolute phase value of the same pair become closer to each other in the three-dimensional space.

For each of the plurality of primary partial regions or the plurality of secondary partial regions, the conversion identification part 55 may respectively identify a plurality of conversion values for converting the plurality of primary coordinates corresponding to the primary partial region or the plurality of secondary coordinates corresponding to the secondary partial region. The conversion identification part 55 identifies a conversion value for each individual primary partial region divided by the region dividing part 53.

At this time, for each of the plurality of primary partial regions, the conversion identification part 55 identifies a conversion value for converting the primary coordinates or the secondary coordinates so that the primary coordinates included in the primary partial region in the three-dimensional space and the secondary coordinates corresponding to the same absolute phase value as that of the primary coordinates become closer to each other in the three-dimensional space. The conversion identification part 55 identifies a conversion value for each primary partial region, thereby enabling alignment between smaller regions. Therefore, the conversion identification part 55 can improve the accuracy of alignment between the primary coordinates and the secondary coordinates.

The conversion identification part 55 enables more efficient measurement by performing alignment for each primary partial region using only the primary partial region designated in advance, which is necessary for measurement. Further, the conversion identification part 55 is not limited to the example of dividing a three-dimensional region. For example, the conversion identification part 55 may generate a partial image by dividing the primary captured image or the secondary captured image to identify a conversion value for each partial image. In this manner, since the conversion identification part 55 identifies a plurality of conversion values corresponding to the plurality of primary partial regions or secondary partial regions, even if a measurement error that is not uniform in the primary coordinates or the secondary coordinates occurs due to the passage of time or temperature changes, it is possible to align the primary coordinates or the secondary coordinates accurately.

The conversion identification part 55 may identify a primary feature amount for each primary partial region and identify a primary degree of reliability on the basis of the identified primary feature amount. The conversion identification part 55 may identify a secondary feature amount for each secondary partial region and identify a secondary degree of reliability on the basis of the identified secondary feature amount. The conversion identification part 55 may prevent a primary partial region in which the identified primary degree of reliability is equal to or less than a threshold from being used in the calculation of the conversion value. The conversion identification part 55 may exclude the primary partial region in which the identified primary degree of reliability is equal to or less than the threshold, from the three-dimensional geometry of the object to be measured after alignment.

If the first identification part 541 and the second identification part 542 identify a plurality of primary absolute phase values and secondary absolute phase values over a plurality of instances of measurement, the conversion identification part 55 respectively identifies a plurality of pairs in which the primary absolute phase value and the secondary absolute phase value become equal to each other in the respective measurements. The conversion identification part 55 identifies a conversion value for the plurality of pairs identified in the respective measurements so that primary coordinates corresponding to each of primary absolute phase values of a pair and secondary coordinates corresponding to secondary absolute phase values of the same pair become closer to each other in the three-dimensional space. The conversion identification part 55 respectively identifies a plurality of conversion values for a plurality of instances of measurement. The conversion identification part 55 identifies statistical quantities of the plurality of conversion values. The statistical quantity is an average value of a plurality of conversion values corresponding to a plurality of instances of measurement, for example. The statistical quantity may be a median value of the plurality of conversion values corresponding to the plurality of instances of measurement.

In addition, if the conversion identification part 55 identifies statistical quantities of the plurality of conversion values corresponding to the plurality of instances of measurement, the plurality of instances of measurement may be performed by repeatedly projecting the same striped image with the same projection part 1 or 2, but the present disclosure is not limited to this. One projection part 1 may project a two-directional striped image, or the projection part 1 or 2 may project a two-directional striped image. At this time, the conversion identification part 55 may identify statistical quantities of the plurality of conversion values corresponding to the plurality of instances of measurement obtained by a combination of different projection parts.

If the primary absolute phase value or the secondary absolute phase value includes noise, the conversion identification part 55 may not be able to accurately align the primary coordinates or the secondary coordinates so as to bring the primary coordinates corresponding to the primary absolute phase value and the secondary coordinates corresponding to the secondary absolute phase value closer to each other. Therefore, the conversion identification part 55 may identify, on the basis of the conversion value, a portion where the primary coordinates corresponding to the primary absolute phase value in the three-dimensional space and the secondary coordinates corresponding to the secondary absolute phase value that is equal to this primary absolute phase value cannot be brought closer to each other in the three-dimensional space.

For example, if there remains a portion in the primary coordinates that does not match the secondary coordinates, the conversion identification part 55 identifies this portion. The primary coordinates are coordinates converted by using the identified conversion value. When there are a first predetermined number or more of portions where the primary coordinates and the secondary coordinates cannot be brought closer to each other, the conversion identification part 55 may determine that alignment is impossible. The first predetermined number is determined depending on the size of the object to be measured, for example. If there are a second predetermined number or more of portions where the primary coordinates and the secondary coordinates cannot be brought closer to each other, the conversion identification part 55 may identify that there is an abnormality in the first image capturing part 3, the second image capturing part 4, or the projection part. The second predetermined number is a number that is larger than the first predetermined number, for example.

After converting the primary coordinates or the secondary coordinates using the identified conversion value, the conversion identification part 55 identifies three-dimensional coordinates included in the object to be measured by statistical processing based on the primary degree of reliability identified by the first identification part 541 and the secondary degree of reliability identified by the second identification part 542. The statistical processing is to calculate an average value, for example. More specifically, the conversion identification part 55 identifies a primary weight of a primary coordinate value on the basis of the primary degree of reliability identified by the first identification part 541 in at least one of the first direction or the second direction. For example, the conversion identification part 55 sets the primary weight of the primary coordinate value to a larger value as the primary degree of reliability identified by the first identification part 541 becomes higher. The conversion identification part 55 identifies a secondary weight of a secondary coordinate value on the basis of the secondary degree of reliability in at least one of the first direction or the second direction.

The conversion identification part 55 identifies average three-dimensional coordinates by weighted averaging using the primary weight and the secondary weight. The conversion identification part 55 identifies the average three-dimensional coordinates by weighted averaging for calculating the sum of i) a value obtained by multiplying the primary weight by the primary coordinates corresponding to the primary absolute phase value and ii) a value obtained by multiplying the secondary weight by the secondary coordinates corresponding to the secondary absolute phase value.

The conversion identification part 55 may evaluate the quality of alignment on the basis of the primary degree of reliability and the secondary degree of reliability. For example, if the primary degree of reliability is equal to or greater than the threshold, and the secondary degree of reliability is equal to or greater than the threshold, the conversion identification part 55 may determine that alignment is possible. In contrast, if the primary degree of reliability is less than the threshold, or if the secondary degree of reliability is less than the threshold, the conversion identification part 55 may determine that alignment is not possible.

The conversion identification part 55 compares the primary degree of reliability identified by the first identification part 541 with the secondary degree of reliability identified by the second identification part 542. At this time, the conversion identification part 55 compares the primary degree of reliability corresponding to the primary coordinates after alignment to the secondary degree of reliability corresponding to the coordinates that have been converted from the secondary coordinates so as to become closer to the primary coordinates in the alignment.

On the basis of this comparison result, the conversion identification part 55 selects, for each primary coordinate, one of i) the primary coordinates after the alignment or ii) the coordinates that have been converted from the secondary coordinates so as to become closer to the primary coordinates in the alignment. For example, among the primary coordinates and the coordinates that have been converted from the secondary coordinates so as to become closer to the primary coordinates, the conversion identification part 55 selects coordinates that have a higher corresponding degree of reliability. The conversion identification part 55 may identify the three-dimensional geometry of the object to be measured by integrating a plurality of selected coordinates.

The conversion identification part 55 may identify the next timing of identifying a conversion value by predicting a degree of decrease in the measurement accuracy of the three-dimensional geometry due to factors such as the passage of time or temperature changes. For example, the conversion identification part 55 may identify a difference, a ratio, or the like as a comparison between the identified conversion value and a previously identified conversion value, and identify the next timing of identifying a conversion value on the basis of the identified difference. More specifically, the conversion identification part 55 predicts the timing at which the translation amount included in the conversion value becomes larger than a predetermined translation threshold, on the basis of the identified difference and a period from when the conversion value was identified previously. The conversion identification part 55 shortens the period from when the conversion value was previously identified to when the conversion value is next identified, as the identified difference becomes larger. In this manner, the conversion identification part 55 can accurately set the timing of identifying the conversion value again, depending on whether or not an error due to the passage of time, temperature changes, or the like is likely to occur.

The conversion identification part 55 may predict the timing at which the rotation amount included in the conversion value becomes larger than a predetermined rotation threshold, on the basis of the identified difference and a period from when the conversion value was identified previously. The conversion identification part 55 identifies the predicted timing as the next timing of identifying the conversion value.

The conversion identification part 55 may identify the conversion value if the surrounding temperature of the three-dimensional geometry measurement apparatus 100 changes by a predetermined amount or more compared with the surrounding temperature at the time when the conversion value was previously identified. The predetermined amount is several degrees, for example. The conversion identification part 55 need not identify the conversion value if the surrounding temperature of the three-dimensional geometry measurement apparatus 100 has not changed by the predetermined amount or more. The conversion identification part 55 may identify the conversion value every time a predetermined period passes from when the conversion value was previously identified. The predetermined period is several hours or several tens of days, for example. The conversion identification part 55 may identify the conversion value if the arrangement of the first image capturing part 3, the second image capturing part 4, the first projection part 1, or the second projection part 2 has been changed.

The conversion identification part 55 need not identify a pair in which the primary absolute phase value and the secondary absolute phase value are equal to each other, for all the pixels of the first image capturing part 3 and all the pixels of the second image capturing part 4. That is, the conversion identification part 55 may identify a pair in which the primary absolute phase value and the secondary absolute phase value are equal to each other, for a portion of the pixels of the first image capturing part 3 and a portion of the pixels of the second image capturing part 4.

For example, after excluding portions of the plurality of pixels of the first image capturing part 3 and the second image capturing part 4, the conversion identification part 55 may identify a pair in which the primary absolute phase value and the secondary absolute phase value are equal to each other, for the plurality of pixels of the first image capturing part 3 after the exclusion and the plurality of pixels of the second image capturing part 4 after the exclusion. The conversion identification part 55 outputs information indicating the identified conversion value to the geometry identification part 56. The conversion identification part 55 operating in this manner makes it possible to reduce the time required to identify the conversion value. The conversion identification part 55 may exclude only some pixels of one of the first image capturing part 3 or the second image capturing part 4.

The conversion identification part 55 may evaluate the accuracy of alignment between the primary coordinates and the secondary coordinates, on the basis of the size of a region that is commonly included in both the primary captured image and the secondary captured image in the object to be measured. For example, the conversion identification part 55 may determine that it is possible to align the primary coordinates and the secondary coordinates if the area of the region that is commonly included in both the primary captured image and the secondary captured image in the object to be measured is equal to or greater than a threshold. The threshold is determined depending on the size of the object to be measured, for example.

If the area of the region that is commonly included in both the primary captured image and the secondary captured image in the object to be measured is less than the threshold, the conversion identification part 55 may determine that it is not possible to align the primary coordinates and the secondary coordinates. The conversion identification part 55 may display, on the display part 6, the region that is commonly included in both the primary captured image and the secondary captured image. An administrator can appropriately place a frame or the like that houses the image capturing part or the projection part by referencing the display part 6 that displays the region that is commonly included in both the primary captured image and the secondary captured image.

In a case where the three-dimensional geometry measurement apparatus 100 includes three or more image capturing parts, the conversion identification part 55 may identify whether or not it is possible to align a plurality of three-dimensional coordinates identified by the geometry identification part 56 from captured images captured by two image capturing parts, among three or more image capturing parts, for the respective combination of image capturing parts. The conversion identification part 55 may identify a combination of two image capturing parts that is determined to enable alignment.

If it is possible to align the three-dimensional coordinates identified by the geometry identification part 56 from the captured image captured by one image capturing part and the three-dimensional coordinates identified by the geometry identification part 56 from captured images captured by a plurality of other image capturing parts, the conversion identification part 55 may obtain a plurality of results of alignment between i) the three-dimensional coordinates identified by the geometry identification part 56 from the captured image captured by this one image capturing part, and ii) the three-dimensional coordinates identified by the geometry identification part 56 from the captured images captured by the plurality of other image capturing parts, and average the plurality of alignment results, thereby identifying the average as the final alignment result.

[Identification of Three-Dimensional Geometry]

The geometry identification part 56 identifies the three-dimensional geometry of the object to be measured W. For example, after the conversion identification part 55 has identified the conversion value, the geometry identification part 56 identifies the three-dimensional geometry of the object to be measured W captured by the capturing control part 52 in order for the conversion identification part 55 to identify the conversion value. For example, on the basis of the primary captured image and the secondary captured image generated by the capturing control part 52 again for the object to be measured W captured by the capturing control part 52 in order for the conversion identification part 55 to identify the conversion value, the geometry identification part 56 identifies the three-dimensional geometry of this object to be measured.

When the capturing control part 52 generates the primary captured image and the secondary captured image again, one or more projection parts project the first striped projection image and the second striped projection image onto the object to be measured. Further, the geometry identification part 56 may identify the three-dimensional geometry of an object to be measured that is different from the object to be measured W captured by the capturing control part 52 when the conversion identification part 55 identifies the conversion value. The geometry identification part 56 may use a new conversion value that has been identified by the conversion identification part 55 again in every measurement of the object to be measured, or may use a conversion value, which has been identified by the conversion identification part 55 once, for the next and subsequent measurements.

If the first identification part 541 identifies the primary absolute phase value corresponding to a primary captured image that is different from the primary captured image generated by the capturing control part 52 when the conversion identification part 55 identifies the conversion value, the geometry identification part 56 identifies primary coordinates corresponding to the identified primary absolute phase value. If the second identification part 542 identifies the secondary absolute phase value corresponding to a secondary captured image that is different from the secondary captured image generated by the capturing control part 52 when the conversion identification part 55 identifies the conversion value, the geometry identification part 56 identifies secondary coordinates corresponding to the identified secondary absolute phase value.

In addition, the geometry identification part 56 may use the primary absolute phase value or the secondary absolute phase value, as-is, that has been used when the conversion identification part 55 identifies the conversion value, for acquiring the geometry of the object to be measured. The geometry identification part 56 may identify primary coordinates corresponding to this primary absolute phase value and may identify secondary coordinates corresponding to this secondary absolute phase value.

The geometry identification part 56 converts at least one of the identified primary coordinates or the identified secondary coordinates on the basis of the conversion value identified by the conversion identification part 55. The geometry identification part 56 identifies the three-dimensional geometry of the object to be measured on the basis of the converted coordinates. For example, the geometry identification part 56 translates the primary coordinates by the translation amount included in the conversion value identified by the conversion identification part 55, and rotates the primary coordinates by the rotation amount included in the conversion value identified by the conversion identification part 55, thereby aligning both the primary coordinates and the secondary coordinates so that the primary coordinates and the secondary coordinates match with each other in a portion where the primary coordinates and the secondary coordinates overlap with each other. The geometry identification part 56 identifies the three-dimensional geometry of the entire object to be measured by connecting the converted primary coordinates and the secondary coordinates. If the conversion identification part 55 identifies a statistical quantity of the conversion value, the geometry identification part 56 may convert the primary coordinates or the secondary coordinates on the basis of the statistical quantity of this conversion value. The statistical quantity is an average value, for example, but it may be a median value. In this manner, the geometry identification part 56 can prevent a decrease in the accuracy of alignment of the primary coordinates or the secondary coordinates due to statistical dispersion.

After the primary coordinates have been converted using the conversion value, the geometry identification part 56 may identify an error between the converted primary coordinates and the secondary coordinates. The geometry identification part 56 may identify an average value of errors for a plurality of primary coordinates included in the object to be measured, and may determine that the alignment is appropriate if the identified average value is less than a threshold. On the other hand, if the identified average value is equal to or greater than the threshold, the geometry identification part 56 may determine that the alignment is not appropriate.

If the conversion identification part 55 identifies a portion of the object to be measured where the primary coordinates and the secondary coordinates cannot be brought closer to each other in the three-dimensional space, the geometry identification part 56 may identify the three-dimensional geometry of the object to be measured W excluding the identified portion. In this manner, the geometry identification part 56 can identify the three-dimensional geometry of the object to be measured W except for a portion affected by noise or the like. The geometry identification part 56 may determine that alignment is impossible if the number of portions of the object to be measured where the primary coordinates and the secondary coordinates cannot be brought closer to each other in the three-dimensional space is equal to or greater than a threshold. In this manner, the geometry identification part 56 can prevent a decrease in the alignment accuracy if there are many portions affected by noise or the like. After the conversion identification part 55 identifies a portion of the object to be measured where the primary coordinates and the secondary coordinates cannot be brought closer to each other in the three-dimensional space in the first alignment, the geometry identification part 56 performs alignment between the primary coordinates and the secondary coordinates again except for the identified portion, so that the alignment accuracy can be improved.

The geometry identification part 56 may identify primary coordinates corresponding to the same primary captured image as the primary captured image generated by the capturing control part 52 when the conversion identification part 55 identifies a first conversion value, and may identify secondary coordinates corresponding to the same secondary captured image as the secondary captured image generated by the capturing control part 52 when the conversion identification part 55 identifies a second conversion value. The geometry identification part 56 converts the primary coordinates with the first conversion value and converts the secondary coordinates with the second conversion value, thereby aligning both the primary coordinates and the secondary coordinates in a portion where they overlap with each other. The geometry identification part 56 may identify the three-dimensional geometry of the object to be measured W by connecting the converted primary coordinates and the converted secondary coordinates.

[Displaying a Three-Dimensional Geometry or a Conversion Value]

The display control part 57 displays, on the display part 6, the three-dimensional geometry of the object to be measured W identified by the geometry identification part 56. If the conversion identification part 55 identifies a conversion value every predetermined period, the display control part 57 may display the transition of conversion values identified by the conversion identification part 55 in the past. For example, the display control part 57 may display a graph in which rotation amounts or translation amounts included in the conversion values identified by the conversion identification part 55 in the past one year are plotted in a time series. In this manner, since the display control part 57 displays transition of the conversion values, the user can assess the accuracy of alignment between primary coordinates and secondary coordinates and determine whether or not alignment of the primary coordinates or the secondary coordinates is necessary by referencing the rotation amounts or the translation amounts or the like included in the conversion values.

[Identification of a Conversion Value by the Three-Dimensional Geometry Measurement Apparatus 100]

Figure 14:
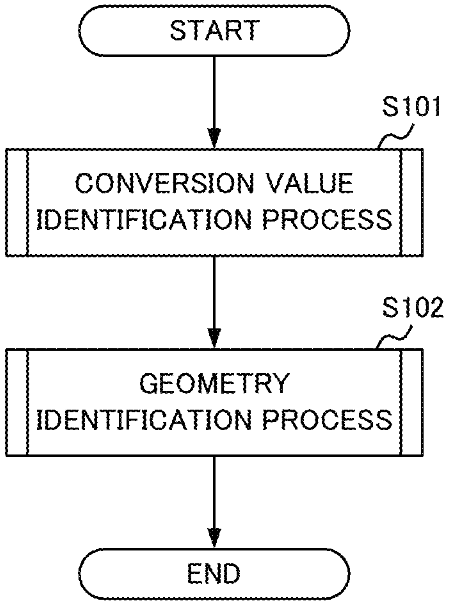
FIG. 14 is a flowchart showing a processing procedure for identifying a three-dimensional geometry of an object to be measured with the three-dimensional geometry measurement apparatus.

FIG. 14 is a flowchart showing a processing procedure for identifying the three-dimensional geometry of the object to be measured with the three-dimensional geometry measurement apparatus 100. This processing procedure starts when measurement of the three-dimensional geometry of the object to be measured is started, for example. In the three-dimensional geometry measurement apparatus 100, after the conversion identification part 55 has executed a conversion value identification process (S101), the geometry identification part 56 identifies the three-dimensional geometry of the object to be measured by executing a geometry identification process (S102), and finishes the processing.

Figure 15:
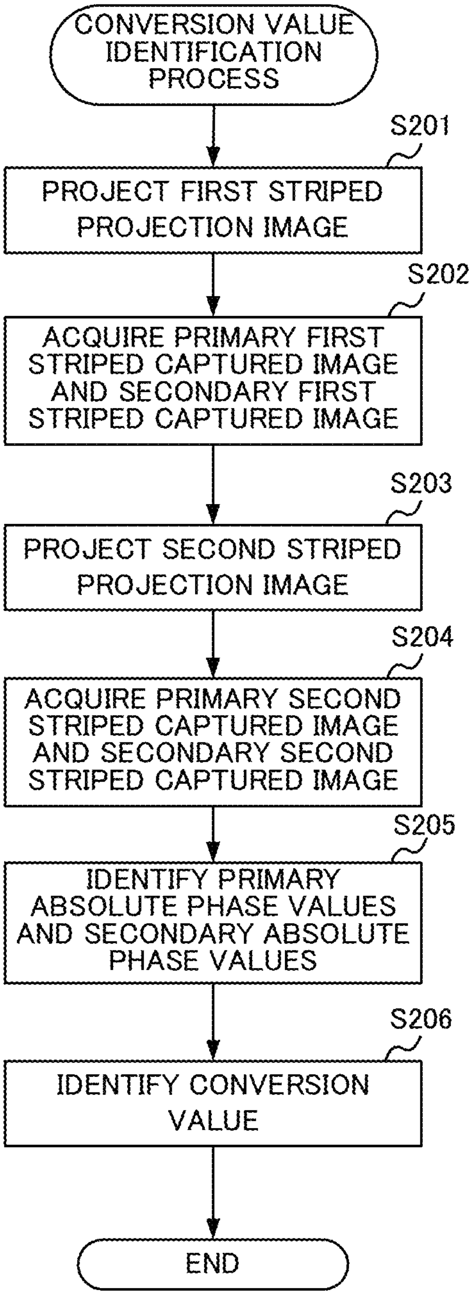
FIG. 15 is a flowchart showing a procedure of a conversion value identification process of FIG. 14.

FIG. 15 is a flowchart showing a procedure of the conversion value identification process (S101) in FIG. 14. First, the projection control part 51 causes the first projection part 1 to project the first striped projection image onto the object to be measured (S201). The capturing control part 52 acquires the primary first striped captured image with the first image capturing part 3. The capturing control part 52 acquires the secondary first striped captured image with the second image capturing part 4 (S202). The projection control part 51 causes the second projection part 2 to project the second striped projection image onto the object to be measured (S203). The capturing control part 52 acquires the primary second striped captured image with the first image capturing part 3. The capturing control part 52 acquires the secondary second striped captured image with the second image capturing part 4 (S204).

The first identification part 541 identifies primary absolute phase values in the first direction and the second direction corresponding to each of the plurality of pixels of the first image capturing part 3. The second identification part 542 identifies secondary absolute phase values in the first direction and the second direction corresponding to each of the plurality of pixels of the second image capturing part 4 (S205). The conversion identification part 55 identifies a conversion value for converting primary coordinates corresponding to a plurality of primary absolute phase values identified by the first identification part 541 so that the plurality of primary coordinates cand a plurality of secondary coordinates corresponding to a plurality of secondary absolute phase values identified by the second identification part 542 become closer to each other (S206), and finishes the processing.

Figure 16:
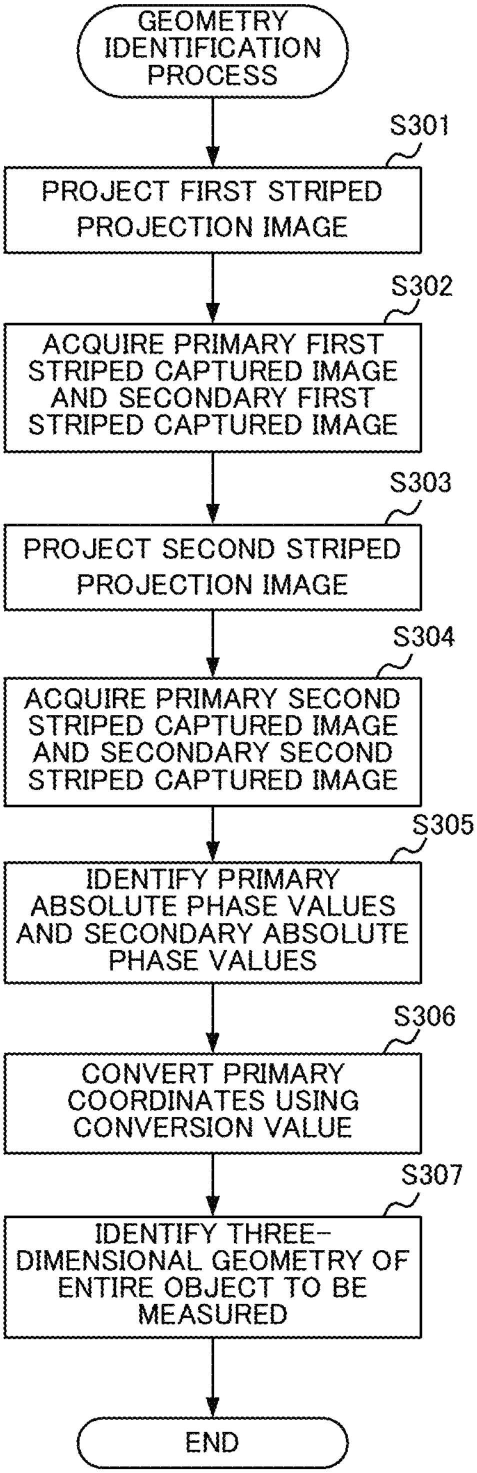
FIG. 16 is a flowchart showing a procedure of a geometry identification process of FIG. 14.

FIG. 16 is a flowchart showing a procedure of the geometry identification process (S102) in FIG. 14. The processing procedure of S301 to S305 of FIG. 16 is the same as that of S201 to S205 of FIG. 15, and thus description thereof will be omitted. The geometry identification part 56 converts the plurality of primary coordinates corresponding to the plurality of primary absolute phase values identified by the first identification part 541, using the conversion value identified by the conversion identification part 55 (S306). The conversion identification part 55 identifies the three-dimensional geometry of the entire object to be measured by connecting the plurality of converted primary coordinates and the plurality of secondary coordinates corresponding to the plurality of secondary absolute phase values identified by the second identification part 542 (S307).

Second Embodiment

Figure 17:
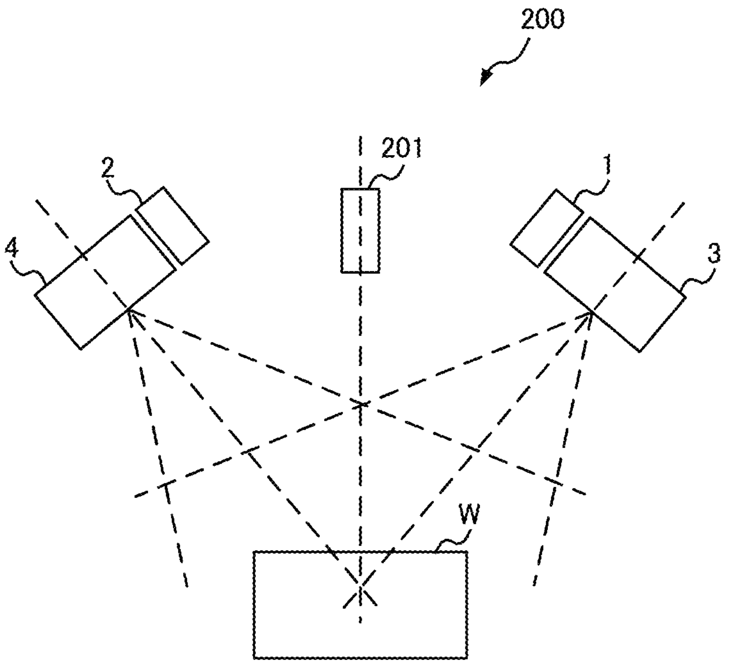
FIG. 17 shows a configuration of a three-dimensional geometry measurement apparatus according to a second embodiment.

In the second embodiment, an example in which a three-dimensional geometry measurement apparatus 200 includes three or more image capturing parts will be described. FIG. 17 shows a configuration of the three-dimensional geometry measurement apparatus 200 according to the second embodiment. The three-dimensional geometry measurement apparatus 200 includes an auxiliary image capturing part 201 in addition to the first image capturing part 3 and the second image capturing part 4. The capturing control part 52 generates a primary first striped captured image by capturing, with the first image capturing part 3, the object to be measured while the first projection part 1 projects the first striped projection image. The capturing control part 52 generates a tertiary first striped captured image by capturing, with the auxiliary image capturing part 201, the object to be measured while the first projection part 1 projects the first striped projection image.

The capturing control part 52 generates a primary second striped captured image by capturing, with the first image capturing part 3, the object to be measured while the first projection part 1 projects the second striped projection image. The capturing control part 52 generates a tertiary second striped captured image by capturing, with the auxiliary image capturing part 201, the object to be measured while the first projection part 1 projects the second striped projection image.

The capturing control part 52 generates a secondary first striped captured image by capturing, with the second image capturing part 4, the object to be measured while the second projection part 2 projects the first striped projection image. The capturing control part 52 generates a quaternary first striped captured image by capturing, with the auxiliary image capturing part 201, the object to be measured while the second projection part 2 projects the first striped projection image. The capturing control part 52 generates a secondary second striped captured image by capturing, with the second image capturing part 4, the object to be measured while the second projection part 2 projects the second striped projection image. The capturing control part 52 generates a quaternary second striped captured image by capturing, with the auxiliary image capturing part 201, the object to be measured while the second projection part 2 projects the second striped projection image.

The first identification part 541 identifies primary absolute phase values in the first direction and the second direction corresponding to each of a plurality of pixels of the first image capturing part 3, on the basis of the images of the first pattern and the second pattern in the primary captured images. The first identification part 541 identifies tertiary absolute phase values in the first direction and the second direction corresponding to each of a plurality of pixels of the auxiliary image capturing part 201, on the basis of the images of the first pattern and the second pattern in the tertiary first striped captured image and the tertiary second striped captured image.

The second identification part 542 identifies secondary absolute phase values in the first direction and the second direction corresponding to each of a plurality of pixels of the second image capturing part 4, on the basis of the images of the first pattern and the second pattern in the secondary captured images. The second identification part 542 identifies quaternary absolute phase values in the first direction and the second direction corresponding to each of a plurality of pixels of the auxiliary image capturing part 201, on the basis of the images of the first pattern and the second pattern in the quaternary first striped captured image and the quaternary second striped captured image.

If the primary absolute phase value identified by the first identification part 541 is equal to the identified tertiary absolute phase value, a pixel of the first image capturing part 3 corresponding to this primary absolute phase value and a pixel of the auxiliary image capturing part 201 corresponding to this tertiary absolute phase value correspond to the same three-dimensional coordinates of the object to be measured. The conversion identification part 55 identifies a plurality of pairs of pixels of the first image capturing part 3 and the auxiliary image capturing part 201 in which the primary absolute phase value identified by the first identification part 541 and the identified tertiary absolute phase value become equal to each other. Similarly, the conversion identification part 55 identifies a plurality of pairs of pixels of the second image capturing part 4 and the auxiliary image capturing part 201 in which a plurality of secondary absolute phase values identified by the second identification part 542 and the identified quaternary absolute phase value become equal to each other.

It can be said that the tertiary absolute phase value and the quaternary absolute phase value corresponding to the same pixel of the auxiliary image capturing part 201 correspond to the same three-dimensional coordinates on the object to be measured. The conversion identification part 55 respectively identifies a plurality of pairs of the tertiary absolute phase value and the quaternary absolute phase value corresponding to the same pixel of the auxiliary image capturing part 201, with respect to the plurality of pixels of the auxiliary image capturing part 201. The conversion identification part 55 identifies a plurality of combinations of the primary absolute phase value, the tertiary absolute phase value, the quaternary absolute phase value, and the secondary absolute phase value corresponding to the same three-dimensional coordinates on the object to be measured, by referencing the identified pairs of the tertiary absolute phase value and the quaternary absolute phase value.

The conversion identification part 55 references the plurality of identified combinations to identify a conversion value for converting i) primary coordinates corresponding to the primary absolute phase values in the first direction and the second direction identified by the first identification part 541 or ii) secondary coordinates corresponding to the secondary absolute phase values in the first direction and the second direction identified by the second identification part 542 so that the primary coordinates and the secondary coordinates become closer to each other, in a similar manner as in the first embodiment.

The geometry identification part 56 converts at least one of the identified primary coordinates or the identified secondary coordinates on the basis of the conversion value identified by the conversion identification part 55, in a similar manner as in the first embodiment. The geometry identification part 56 identifies the three-dimensional geometry of the object to be measured on the basis of the converted coordinates.

The projection image that the projection control part 51 projects onto the object to be measured in order for the conversion identification part 55 to identify the plurality of combinations of the primary absolute phase value, the tertiary absolute phase value, the quaternary absolute phase value, and the secondary absolute phase value corresponding to the same three-dimensional coordinates on the object to be measured may be different from the projection image that the projection control part 51 projects onto the object to be measured in order to identify the conversion value. The projection image that the projection control part 51 projects onto the object to be measured in order for the conversion identification part 55 to identify the plurality of combinations of the primary absolute phase value, the tertiary absolute phase value, the quaternary absolute phase value, and the secondary absolute phase value corresponding to the same three-dimensional coordinates on the object to be measured may be different from the projection image that the projection control part 51 projects in order for the geometry identification part 56 to identify the three-dimensional geometry of the object to be measured by converting the primary coordinates or the secondary coordinates using the conversion value.

According to the three-dimensional geometry measurement apparatus 200 of the second embodiment, even if a part of the first pattern of the projection image projected from the first projection part 1 is not included in the secondary captured image generated by the second image capturing part 4, due to irregularities, surface reflectance, or the like of the object to be measured, the conversion identification part 55 can identify a pair of the primary absolute phase value and the secondary absolute phase value corresponding to the same three-dimensional coordinates of the object to be measured, using the tertiary captured images and the quaternary captured images generated by the auxiliary image capturing part 201. In this manner, in the three-dimensional geometry measurement apparatus 200, since the first identification part 541 and the second identification part 542 can acquire a pair of the primary absolute phase value and the secondary absolute phase value more properly, the geometry identification part 56 can measure the object to be measured with higher accuracy.

Third Embodiment

In the first and second embodiments, an example in which the geometry identification part 56 converts at least one of the identified primary coordinates or the identified secondary coordinates on the basis of the conversion value identified by the conversion identification part 55 has been described. In the third embodiment, an example of including a determination part 301 that determines whether or not misalignment has occurred in the primary coordinates or secondary coordinates identified by the geometry identification part 56 on the basis of the conversion value identified by the conversion identification part 55 is described.

Figure 18:
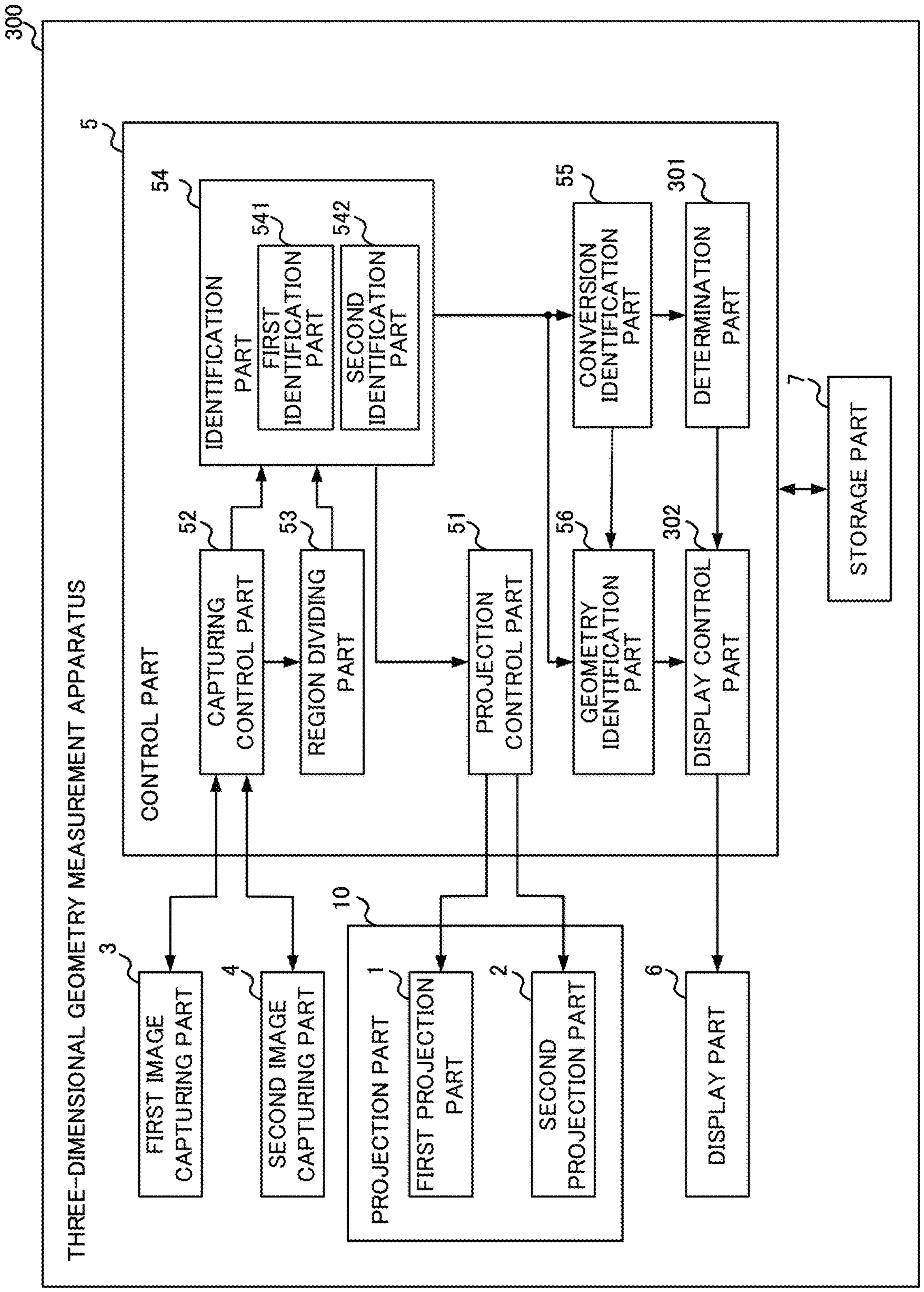
FIG. 18 shows a configuration of a three-dimensional geometry measurement apparatus according to a third embodiment.

FIG. 18 shows a configuration of a three-dimensional geometry measurement apparatus 300 according to the third embodiment. The three-dimensional geometry measurement apparatus 300 shown in FIG. 18 differs from the example of FIG. 3 in that it further includes a determination part 301. Functional blocks that are similar to those in FIG. 3 are denoted by the same reference numerals, and description thereof is omitted.

If the conversion value identified by the conversion identification part 55 is larger than a predetermined reference value, the determination part 301 determines that misalignment has occurred between the primary coordinates identified by the geometry identification part 56 and the identified secondary coordinates. The reference value is a conversion value identified by the conversion identification part 55 last time, for example. If a distance by which the primary coordinates included in the conversion value are translated (hereinafter referred to as a translation amount) is larger than a translation amount included in the conversion value identified by the conversion identification part 55 last time, the determination part 301 determines that misalignment has occurred between the primary coordinates and the secondary coordinates, for example. In contrast, if the translation amount by which the primary coordinates included in the conversion value is translated is equal to or less than the translation amount identified by the conversion identification part 55 last time, the determination part 301 does not determine that misalignment has occurred between the primary coordinates and the secondary coordinates.

If an angle by which the primary coordinates included in the conversion value are rotated (hereinafter referred to as a rotation amount) is larger than a rotation amount included in the conversion value identified by the conversion identification part 55 last time, the determination part 301 may determine that misalignment has occurred between the primary coordinates and the secondary coordinates. In contrast, if the rotation amount by which the primary coordinates included in the conversion value is equal to or less than the rotation amount included in the conversion value identified by the conversion identification part 55 last time, the determination part 301 need not determine that misalignment has occurred between the primary coordinates and the secondary coordinates.

If the translation amount or the rotation amount included in the conversion value is significantly large, there is a possibility that a defect such as misalignment has occurred in the projection part 10, the first image capturing part 3, or the second image capturing part 4. Therefore, if at least one of i) the translation amount by which the primary coordinates included in the conversion value are translated or ii) the rotation amount by which the primary coordinates included in the conversion value are rotated is larger than the predetermined reference value, the determination part 301 determines that a defect has occurred in at least one or more of the projection part 10, the first image capturing part 3, or the second image capturing part 4. At this time, if the projection part and the image capturing part are housed in the same housing, the determination part 301 may determine that a change in the overall position, posture, or the like of the housing has occurred. Even though the determination part 301 determines that misalignment has occurred, the geometry identification part 56 uses the conversion value that has been identified this time, and if the corresponding primary coordinates and secondary coordinates can be well aligned with each other, the geometry identification part 56 may use the conversion value that has been identified this time.

For example, the determination part 301 determines whether or not a defect has occurred in at least one or more of the projection part 10, the first image capturing part 3, or the second image capturing part 4, on the basis of a difference, a degree of similarity, or the like between i) the translation amount included in the conversion value identified by the conversion identification part 55 last time and ii) the translation amount included in the conversion value identified this time. For example, the determination part 301 calculates the square root of the difference between a translation amount $[X_1, Y_1, Z_1]$ included in the conversion value identified by the conversion identification part 55 last time and a translation amount $[X_2, Y_2, Z_2]$ included in the conversion value identified this time, by the following equation (4).

$$\sqrt{(X_1 - X_2)^2 + (Y_1 - Y_2)^2 + (Z_1 - Z_2)^2} \quad (4)$$

If the calculated square root of the difference is equal to or greater than a translation threshold, the determination part 301 determines that a defect has occurred in at least one or more of the first image capturing part 3 or the second image capturing part 4. The translation threshold is determined depending on the size of the object to be measured, for example. In contrast, if the calculated square root of the difference is less than the translation threshold, the determination part 301 does not determine that a defect has occurred in at least one or more of the first image capturing part 3 or the second image capturing part 4.

The determination part 301 determines whether or not a defect has occurred in at least one or more of the projection part 10, the first image capturing part 3, or the second image capturing part 4, on the basis of a difference or a degree of similarity between i) the rotation amount included in the conversion value identified by the conversion identification part 55 last time and ii) the rotation amount included in the conversion value identified this time. For example, the determination part 301 calculates the square root of the difference between i) the rotation amount included in the conversion value identified by the conversion identification part 55 last time and ii) the rotation amount included in the conversion value identified this time. If the calculated square root of the difference is equal to or greater than a rotation threshold, the determination part 301 determines that a defect has occurred in at least one or more of the first image capturing part 3 or the second image capturing part 4. The rotation threshold is determined depending on the size or the like of the object to be measured, for example. In contrast, if the calculated square root of the difference is less than the rotation threshold, the determination part 301 does not determine that a defect has occurred in at least one or more of the first image capturing part 3 or the second image capturing part 4.

Further, after the geometry identification part 56 has performed alignment between the primary coordinates and the secondary coordinates by converting the primary coordinates or the secondary coordinates using the conversion value, the determination part 301 may calculate a coordinate difference between an individual point of the primary coordinates and an individual point of the corresponding secondary coordinates, thereby identifying a degree of similarity between the primary coordinates and the secondary coordinates. The degree of similarity is calculated by various known methods on the basis of a plurality of calculated coordinate differences. If the identified degree of similarity is equal to or less than a threshold, the determination part 301 determines that a defect has occurred in at least one or more of the projection part, the first image capturing part 3, or the second image capturing part 4. The threshold is determined in accordance with designated tolerance of errors of geometry measurement, or the total number of points at which a coordinate difference has been calculated, for example.

If the identified degree of similarity is equal to or less than the threshold, the determination part 301 does not determine that a defect has occurred in at least one or more of the projection part, the first image capturing part 3, or the second image capturing part 4. In this manner, the determination part 301 can cause the user to assess that a defect has occurred in the projection part or the like in a case where alignment accuracy is reduced due to a defect in the projection part or the like.

The display control part 302 (corresponding to an output part) outputs a determination result from the determination part 301 regarding whether or not misalignment has occurred. In the example of FIG. 18, the display control part 302 outputs the determination result to the display part 6. In this manner, since the display control part 302 outputs the determination result from the determination part 301 regarding whether or not misalignment has occurred in the primary coordinates or the secondary coordinates, the user can easily assess that the state of alignment of three-dimensional geometry data has deteriorated due to the influence of the passage of time, temperature changes, or the like.

[Processing Procedure for Determining Whether or not Misalignment has Occurred]

Figure 19:
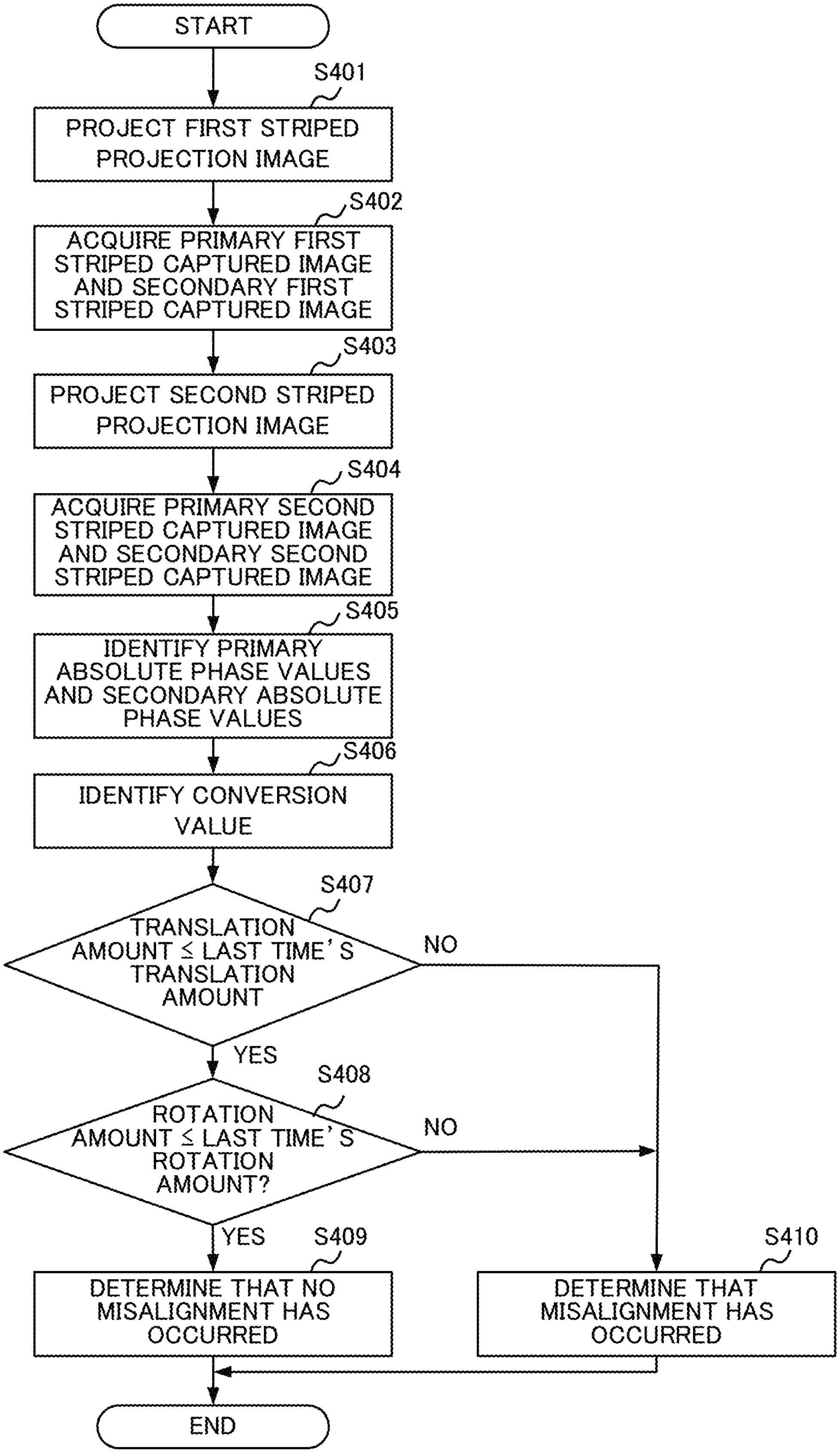
FIG. 19 is a flowchart showing a processing procedure for determining whether or not misalignment has occurred in primary coordinates or secondary coordinates in the three-dimensional geometry measurement apparatus.

FIG. 19 is a flowchart showing a processing procedure for determining whether or not misalignment has occurred in primary coordinates or secondary coordinates in the three-dimensional geometry measurement apparatus 300. This processing procedure starts every time a predetermined period passes, for example. The predetermined period is determined on the basis of the difference between the conversion value previously identified by the conversion identification part 55 and the conversion value identified by the conversion identification part 55 at an earlier time, for example. As an example, as this difference is greater, a shorter period is determined as the predetermined period.

Since steps S401 to S406 in FIG. 19 are the same as steps S201 to S206 in FIG. 15, description thereof will be omitted. The determination part 301 determines whether or not the translation amount by which the primary coordinates are translated in the conversion value identified by the conversion identification part 55 is equal to or less than the translation amount included in the conversion value identified last time (S407).

If it is determined that the translation amount by which the primary coordinates are translated in the conversion value is equal to or less than the translation amount included in the conversion value identified last time ("YES" in S407), the determination part 301 determines whether or not the rotation amount by which the primary coordinates are rotated in the conversion value is equal to or less than the rotation amount included in the conversion value identified last time (S408). If it is determined that the rotation amount by which the primary coordinates are rotated in the conversion value is equal to or less than the rotation amount included in the conversion value identified last time ("YES" in S408), the determination part 301 determines that no misalignment has occurred between the primary coordinates and the secondary coordinates (S409), and finishes the processing.

If it is determined that the translation amount by which the primary coordinates are translated in the conversion value is larger than the translation amount included in the conversion value identified last time in the determination of S407 ("NO" in S407), the determination part 301 determines that misalignment has occurred between the primary coordinates and the secondary coordinates (S410). If it is determined that the rotation amount by which the primary coordinates are rotated is larger than the rotation amount included in the conversion value identified last time in the determination of S408 ("NO" in S408), the determination part 301 determines that misalignment has occurred between the primary coordinates and the secondary coordinates (S410).

[Effects of the Three-Dimensional Geometry Measurement Apparatuses 100 to 300]

According to the three-dimensional geometry measurement apparatuses 100 to 300 of the first to third embodiments, the conversion identification part 55 identifies a conversion value on the basis of a primary captured image and a secondary captured image obtained by capturing the object to be measured. The geometry identification part 56 converts primary coordinates using this conversion value, and then aligns the converted primary coordinates and secondary coordinates, thereby identifying the three-dimensional geometry of the object to be measured. This allows the geometry identification part 56 to prevent a decrease in the accuracy of alignment between the primary coordinates and the secondary coordinates due to the influence of the passage of time, temperature changes, or the like. In addition, since the three-dimensional geometry measurement apparatus 300 outputs information indicating that misalignment has occurred if the conversion value is larger than the conversion value that has been identified last time, the three-dimensional geometry measurement apparatus 300 can recognize that there is a possibility that an error has occurred in the measurement result of the three-dimensional geometry. Therefore, according to the three-dimensional geometry measurement apparatuses 100 to 300, it is possible to prevent measurement of a three-dimensional geometry from occurring while the alignment accuracy of a plurality of pieces of three-dimensional geometry data is reduced.

The present disclosure is explained on the basis of the example embodiments. The technical scope of the present disclosure is not limited to the scope explained in the above embodiments and it is possible to make various changes and modifications within the scope of the disclosure. For example, the specific embodiments of the distribution and integration of the apparatus are not limited to the above embodiments, all or part thereof, can be configured with any unit which is functionally or physically dispersed or integrated. Further, new example embodiments generated by arbitrary combinations of them are included in the example embodiments of the present disclosure. Further, effects of the new example embodiments brought by the combinations also have the effects of the original example embodiments.

Since the conversion identification part 55 identifies correspondence between pixel positions of a plurality of image capturing parts, the geometry identification part 56 may newly calculate the three-dimensional geometry of the object to be measured on the basis of the correspondence identified by the conversion identification part 55.

In the first to third embodiments, the first identification part 541 and the second identification part 542 identifies values in two directions for individual pixels, as a plurality of primary absolute phase values corresponding to the plurality of pixels of the first image capturing part 3 and a plurality of secondary absolute phase values corresponding to the plurality of pixels of the second image capturing part 4. In this case, the conversion identification part 55 can handle the primary absolute phase values and the secondary absolute phase values like two types of images. The conversion identification part 55 may convert these images into low-resolution images. The conversion identification part 55 can find a portion on this low-resolution image of absolute phase values where absolute phase values roughly correspond to each other on the image capturing part 3 side and the image capturing part 4 side. Next, the conversion identification part 55 searches for a corresponding position in detail on the original image of absolute phase values using the corresponding position on the low-resolution image of absolute phase values as an initial value.

In this manner, the conversion identification part 55 can find the corresponding position more efficiently and accurately by using the images of absolute phase values in the two directions. If necessary, the conversion identification part 55 may create a further low-resolution image from the low-resolution image and repeatedly perform a similar search. The conversion identification part 55 may obtain a conversion value on the basis of the corresponding position thus obtained.

The conversion identification part 55 may simply perform exclusion in order to acquire the further low-resolution image, but can also obtain such an image by averaging a plurality of pixels. Using the further low-resolution image prevents the conversion identification part 55 from being affected by noise included in the absolute phase values when roughly finding the corresponding point. This allows the conversion identification part 55 to find more corresponding points more accurately, so that it is possible to obtain a conversion value with higher accuracy.

In a configuration in which a plurality of image capturing parts are used, the conversion identification part 55 identifies which three-dimensional geometry identified from the captured image captured by one imaging capturing part can be aligned with the three-dimensional geometry identified from the captured image captured by another image capturing part among the plurality of image capturing parts. The conversion identification part 55 respectively determines the feasibility of alignment between a three-dimensional geometry corresponding to a certain image capturing part and a three-dimensional geometry corresponding to another image capturing part. For example, the conversion identification part 55 determines that alignment is possible if corresponding points for performing alignment can be sufficiently acquired, and an error between the primary coordinates that has been converted using the conversion value and the secondary coordinates is relatively small. The conversion identification part 55 may search for a combination of the image capturing parts that enables the best alignment by repeatedly performing such a determination while changing a combination of the image capturing parts.

What is claimed is:

1. A three-dimensional geometry measurement apparatus comprising:

a projection part that projects, onto an object to be measured, a first striped projection image having a first pattern in which luminance changes along a first direction, and a second striped projection image having a second pattern in which luminance changes along a second direction that is different from the first direction;

a first image capturing part that generates a first striped captured image by capturing the object to be measured while the first striped projection image is projected, and a second striped captured image by capturing the object to be measured while the second striped projection image is projected;

a first identification part that identifies a primary absolute phase value corresponding to each of a plurality of pixels of the first image capturing part, on the basis of an image of the first pattern in the first striped captured image generated by the first image capturing part and an image of the second pattern in the second striped captured image generated by the first image capturing part;

a second image capturing part that generates a first striped captured image by capturing the object to be measured while the first striped projection image is projected, and a second striped captured image by capturing the object to be measured while the second striped projection image is projected;

a second identification part that identifies a secondary absolute phase value corresponding to each of a plurality of pixels of the second image capturing part, on the basis of an image of the first pattern in the first striped captured image generated by the second image capturing part and an image of the second pattern in the second striped captured image generated by the second image capturing part;

a conversion identification part that identifies a conversion value for converting primary coordinates corresponding to the primary absolute phase value in a three-dimensional space, or secondary coordinates corresponding to the secondary absolute phase value that is equal to the primary absolute phase value so that the primary coordinates and the secondary coordinates become closer to each other in the three-dimensional space;

a geometry identification part that converts the primary coordinates or the secondary coordinates on the basis of the conversion value, and identifies a three-dimensional geometry of the object to be measured on the basis of the converted coordinates;

a determination part that determines that misalignment has occurred between the primary coordinates and the secondary coordinates if the conversion value is larger than a predetermined reference value; and a display that displays a determination result from the determination part, wherein the conversion identification part identifies the conversion value including a translation amount by which the primary coordinates are translated in order to match the primary coordinates to the secondary coordinates, and a rotation amount by which the primary coordinates are rotated in order to match the primary coordinates to the secondary coordinates.

2. The three-dimensional geometry measurement apparatus according to claim 1, further comprising:

a region dividing part that divides a three-dimensional region including a plurality of the primary coordinates corresponding to a plurality of the primary absolute phase values identified by the first identification part into a plurality of primary partial regions, and divides a three-dimensional region including a plurality of the secondary coordinates corresponding to a plurality of the secondary absolute phase values identified by the second identification part into a plurality of secondary partial regions, wherein the conversion identification part identifies, for each of the plurality of primary partial regions, the conversion value for converting the primary coordinates included in the primary partial region, or the secondary coordinates included in the secondary partial region corresponding to the same absolute phase value as that of the primary coordinates so that the primary coordinates and the secondary coordinates become closer to each other in the three-dimensional space.

3. The three-dimensional geometry measurement apparatus according to claim 1, wherein the first identification part respectively identifies a plurality of the primary absolute phase values over a plurality of instances of measurement, the second identification part respectively identifies a plurality of the secondary absolute phase values over the plurality of instances of measurement, the conversion identification part respectively identifies the conversion values for converting a plurality of the primary coordinates corresponding to each of the plurality of primary absolute phase values corresponding to the plurality of instances of measurement in the three-dimensional space, or a plurality of the secondary coordinates corresponding to the secondary absolute phase value that is equal to the primary absolute phase value so that the primary coordinates and the secondary coordinates become closer to each other in the three-dimensional space, and identifies statistical quantities of a plurality of the identified conversion values, and the geometry identification part converts the primary coordinates or the secondary coordinates on the basis of the identified statistical quantity of the conversion value.

4. The three-dimensional geometry measurement apparatus according to claim 1, wherein the first identification part extracts a primary feature amount from the first striped captured image generated by the first image capturing part and the second striped captured image generated by the first image capturing part, and identifies a primary degree of reliability indicating reliability of the primary absolute phase value on the basis of the extracted primary feature amount, and the second identification part extracts a secondary feature amount from the first striped captured image generated by the second image capturing part and the second striped captured image generated by the second image capturing part, and identifies a secondary degree of reliability indicating reliability of the secondary absolute phase value on the basis of the extracted secondary feature amount, and the conversion identification part identifies three-dimensional coordinates included in the object to be measured by statistical processing based on the primary degree of reliability and the secondary degree of reliability.

5. The three-dimensional geometry measurement apparatus according to claim 1, wherein the first identification part extracts a primary feature amount from the first striped captured image generated by the first image capturing part and the second striped captured image generated by the first image capturing part, and identifies a primary degree of reliability indicating reliability of the primary absolute phase value on the basis of the extracted primary feature amount, the second identification part extracts a secondary feature amount from the first striped captured image generated by the second image capturing part and the second striped captured image generated by the second image capturing part, and identifies a secondary degree of reliability indicating reliability of the secondary absolute phase value on the basis of the extracted secondary feature amount, and the conversion identification part identifies a three-dimensional geometry of the object to be measured by selecting, for each of the primary coordinates, one of the primary coordinates after alignment or the secondary coordinates that have been converted so as to become closer to the primary coordinates in the alignment, on the basis of a comparison result between the primary degree of reliability and the secondary degree of reliability.

6. The three-dimensional geometry measurement apparatus according to claim 1, wherein the conversion identification part identifies a next timing of identifying the conversion value on the basis of a result of comparing the identified conversion value with the conversion value that has been identified previously.

7. The three-dimensional geometry measurement apparatus according to claim 1, wherein the conversion identification part identifies the conversion value every predetermined period, and the three-dimensional geometry measurement apparatus further includes a display control part that displays transition of the conversion values identified by the conversion identification part in the past.

8. A three-dimensional geometry measurement apparatus comprising:

a projection part that projects, onto an object to be measured, a first striped projection image having a first pattern in which luminance changes along a first direction, and a second striped projection image having a second pattern in which luminance changes along a second direction that is different from the first direction;

a first image capturing part that generates a first striped captured image by capturing the object to be measured while the first striped projection image is projected, and a second striped captured image by capturing the object to be measured while the second striped projection image is projected;

a first identification part that identifies a primary absolute phase value corresponding to each of a plurality of pixels of the first image capturing part, on the basis of an image of the first pattern in the first striped captured image generated by the first image capturing part and an image of the second pattern in the second striped captured image generated by the first image capturing part;

a second image capturing part that generates a first striped captured image by capturing the object to be measured while the first striped projection image is projected, and a second striped captured image by capturing the object to be measured while the second striped projection image is projected;

a second identification part that identifies a secondary absolute phase value corresponding to each of a plurality of pixels of the second image capturing part, on the basis of an image of the first pattern in the first striped captured image generated by the second image capturing part and an image of the second pattern in the second striped captured image generated by the second image capturing part;

a conversion identification part that identifies a conversion value for converting primary coordinates corresponding to the primary absolute phase value in a three-dimensional space, or secondary coordinates corresponding to the secondary absolute phase value that is equal to the primary absolute phase value so that the primary coordinates and the secondary coordinates become closer to each other in the three-dimensional space; and a geometry identification part that converts the primary coordinates or the secondary coordinates on the basis of the conversion value, and identifies a three-dimensional geometry of the object to be measured on the basis of the converted coordinates, wherein the conversion identification part identifies, on the basis of the conversion value, a portion where the primary coordinates corresponding to the primary absolute phase value in the three-dimensional space and the secondary coordinates corresponding to the secondary absolute phase value that is equal to the primary absolute phase value cannot be brought closer to each other in the three-dimensional space.

9. A three-dimensional geometry measurement apparatus comprising:

a projection part that projects, onto an object to be measured, a first striped projection image having a first pattern in which luminance changes along a first direction, and a second striped projection image having a second pattern in which luminance changes along a second direction that is different from the first direction;

a first image capturing part that generates a first striped captured image by capturing the object to be measured while the first striped projection image is projected, and a second striped captured image by capturing the object to be measured while the second striped projection image is projected;

a first identification part that identifies a primary absolute phase value corresponding to each of a plurality of pixels of the first image capturing part, on the basis of an image of the first pattern in the first striped captured image generated by the first image capturing part and an image of the second pattern in the second striped captured image generated by the first image capturing part;

a second image capturing part that generates a first striped captured image by capturing the object to be measured while the first striped projection image is projected, and a second striped captured image by capturing the object to be measured while the second striped projection image is projected;

a second identification part that identifies a secondary absolute phase value corresponding to each of a plurality of pixels of the second image capturing part, on the basis of an image of the first pattern in the first striped captured image generated by the second image capturing part and an image of the second pattern in the second striped captured image generated by the second image capturing part;

a conversion identification part that identifies a conversion value for converting primary coordinates corresponding to the primary absolute phase value in a three-dimensional space, or secondary coordinates corresponding to the secondary absolute phase value that is equal to the primary absolute phase value so that the primary coordinates and the secondary coordinates become closer to each other in the three-dimensional space; and a geometry identification part that converts the primary coordinates or the secondary coordinates on the basis of the conversion value, and identifies a three-dimensional geometry of the object to be measured on the basis of the converted coordinates, wherein a part of an image capturing range of the first image capturing part and an image capturing range of the second image capturing part do not overlap with each other.

* * * * *